(12) United States Patent
Alam et al.

(10) Patent No.: US 7,669,085 B2
(45) Date of Patent: Feb. 23, 2010

(54) METHOD AND APPARATUS FOR PERFORMING WIRELESS DIAGNOSTICS AND TROUBLESHOOTING

(75) Inventors: Mohammad Shabbir Alam, Redmond, WA (US); Abhishek Abhishek, Woodinville, WA (US); Ari Pekka Niikkonen, Redmond, WA (US); Hui Shen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1198 days.

(21) Appl. No.: 11/107,275

(22) Filed: Apr. 15, 2005

(65) Prior Publication Data

US 2006/0233114 A1 Oct. 19, 2006

(51) Int. Cl.
*G06F 11/00* (2006.01)
(52) U.S. Cl. ........................................................ 714/43
(58) Field of Classification Search ........................ None
See application file for complete search history.

(56) References Cited

U.S. PATENT DOCUMENTS

| | | | | |
|---|---|---|---|---|
| 6,691,256 | B1 * | 2/2004 | Cook et al. | 714/43 |
| 7,257,739 | B2 * | 8/2007 | Quinlan | 714/43 |
| 2002/0072359 | A1 | 6/2002 | Moles et al. | |
| 2004/0078708 | A1 * | 4/2004 | Li et al. | 714/43 |
| 2004/0128586 | A1 * | 7/2004 | Bahr et al. | 714/43 |
| 2004/0255192 | A1 * | 12/2004 | Watanabe et al. | 714/25 |
| 2006/0068839 | A1 * | 3/2006 | Kim et al. | 455/552.1 |

OTHER PUBLICATIONS

WifiEagle, pp. 1-12, http://www.nutsaboutnets.com/performance-wifi/products/product-wifieagle-wifi-channel-analyzer.htm.*
AirSleuth, pp. 1-4, http://www.nutsaboutnets.com/performance-wifi/products/product-airsleuth-wifi-spectrum-analyzer.htm.*
Using the Network Diagnostic Tool, pp. 1-7, http://www.microsoft.com/windowsxp/using/networking/expert/russel_diagnostic.mspx.*
Wi-Net Window, pp. 1-5, http://www.pctestpro.com/lan/wireless/wirelesstesting.htm.*
David G. Thaler and Chinya V. Ravishankar; An Architecture For Inter-Domain Troubleshooting; Electrical Engineering and Computer Science Department, The University of Michigan; pp. 1-16, Sep. 1997.
International Search Report in PCT/US06/13008, dated Aug. 15, 2007, 8 pages.

* cited by examiner

*Primary Examiner*—Michael C Maskulinski
(74) *Attorney, Agent, or Firm*—Wolf, Greenfield & Sacks, P.C.

(57) ABSTRACT

A wireless diagnostics framework that is non-intrusive and stays out of the way of a user is presented. In the case of a failure, prescriptive guidance is provided and/or the framework possibly automatically fixes the problem. The framework includes a wireless diagnostics module that interacts with the operating system's diagnostics framework, helper classes, and wireless components to collect and log wireless diagnostic events and notifications, and issues queries and requests for active diagnostics. The helper classes perform diagnosis and troubleshooting fore their expertise areas based on the information provided by the wireless diagnostics module. The wireless diagnostics module includes an application program interface for communicating with helper classes, an event listener module that provides an event tracing application program interface to in-process modules, an active diagnostics module that issue active packet test requests to a media specific module, and query modules that issue information query requests to media specific modules.

18 Claims, 12 Drawing Sheets

METHOD AND APPARATUS FOR PERFORMING WIRELESS DIAGNOSTICS AND TROUBLESHOOTING

FIELD OF THE INVENTION

This invention relates generally to computer diagnostics and troubleshooting and, more particularly, relates to diagnostics and troubleshooting for wireless related components.

BACKGROUND OF THE INVENTION

With the development and deployment of wireless networking devices such as laptop computers, personal digital assistant devices, etc. and infrastructures, consumers and businesses are increasingly being able to realize the benefits of true mobile computing, collaboration, and information exchange. No longer are business travelers required to carry an assortment of cables and search endlessly for an available data port simply to connect to a network to retrieve email messages, download files, or exchange information. No longer are companies and home consumers restrained in where they may access their networks by the location of the Ethernet jacks on the wall. Meeting participants and groups of friends may now form their own ad hoc networks without connecting cables between themselves or logging in to some preexisting network. They can log onto the network using a wireless protocol while running on battery power, thereby allowing even greater mobility.

However, many users are faced with frustration and confusion when dealing with connection failures. For example, if how networking works is a mystery to users, it is an even bigger mystery to the users when things stop working as the users have no clue of what might be wrong or what is causing the problem, let alone how to fix the problem they are experiencing. The error messages users are receiving are often either cryptic or meaningless to the users, and are often out of context in most cases. A great example is the 'Page cannot be displayed' message when Internet Explorer fails to reach the page the user intended to display. The point of failure could be in numerous places such as on the client system or anywhere in the wireless network. The above is just one example of the messages users typically see when things go wrong, leaving users with no hint or guidance on what to look for or what to do next to fix the problem.

Connection failures also lead to loss of productivity when users, instead of the task at hand, spend time trying to analyze the cause of the problem and restore their connectivity. Eventually they will end up calling for help with IT Helpdesk, their Internet Service Provider, PC OEM, Microsoft, etc. depending on the scenario. Both the user and support professional have their own perception of the problem & possible causes, which further complicates the situation. The problem resolution often happens through trial & error until the problem is fixed or fixes itself leaving both the user and the support professional just guessing what the actual cause of the problem was. These support calls can often get quite long and costly, reducing the profit margins of the hardware, software, and service providers, and increasing the total cost of ownership for the customer, in addition to lost productivity due to downtime.

What is needed and missing from the art is wireless diagnostics capabilities that are non-intrusive and stay out of the way but in the case of failure will provide prescriptive guidance or possibly automatically fix the problems without putting the user's computer or data at risk. The invention provides wireless diagnostic capabilities. These and other advantages of the invention, as well as additional inventive features, will be apparent from the description of the invention provided herein.

BRIEF SUMMARY OF THE INVENTION

The invention provides a wireless diagnostics framework that is non-intrusive and stays out of the way of a user. In the case of a failure, prescriptive guidance is provided and/or the framework possibly automatically fixes the problem. The framework includes a wireless diagnostics module that interacts with the operating system's diagnostics framework, helper classes, and wireless components to collect and log wireless diagnostic events and notifications, and issues queries and requests for active diagnostics. The helper classes perform diagnosis and troubleshooting for their expertise areas based on the information provided by the wireless diagnostics module. The wireless diagnostics module includes an application program interface (API) for communicating with helper classes, an event listener module that provides an event tracing application program interface to in-process modules, an active diagnostics module that issue active packet test requests to a media specific module, and query modules that issue information query requests to media specific modules.

The wireless diagnostics module also includes a distribution module (i.e., a control module) that converges and classifies events from other modules and requests by the helper classes through the API and distributes the information and requests to corresponding modules and/or components. A storage module provides facilities to store, retrieve, and query diagnostics logging information. The storage module is in communication with the operating system's diagnostics infrastructure. The wireless diagnostic module also has a retry request module to retry previous unsuccessful operations with the same configurations to reproduce errors.

When the wireless diagnostics module is not actively diagnosing a problem, it passively logs events. The events include events relating to the loading and unloading of modules by an auto configuration service. The wireless diagnostics module also tracks each network connection attempt and keeps a cache of the results of recent connection attempts when it is not actively diagnosing a problem. The information tracked for each network connection includes a reason for connecting, a reason for disconnecting, a frequency and number of media-events during the connection, and duration times for each activity during a connection.

The helper classes indicate the health of their component in response to receiving a request for their component's health by a network diagnostics framework (NDF), which is part of the operating system's diagnostics infrastructure. A helper class indicates if its component has a healthy state or an unhealthy state. The unhealthy state consists of six states. These states are a LowHealth state, a LowHealth Below state, a LowHealth Downstream state, a HighUtilization state, a HighUtilization Above state, and a HighUtilization Upstream state.

The LowHealth state indicates that the health of the helper class's component is too low. The LowHealth Below state indicates that the health of a local machine component that the helper class's component depends on is low. The LowHealth Downstream state indicates that the health of a network destination or component the helper class's component relies upon is too low.

The HighUtilization state indicates that the utilization of the helper class's component is too high (i.e., is demanding too many resources.). The HighUtilization Above state indicates a component of a local machine that depends on the helper class's component has a high utilization of the helper class's component. The HighUtilization Upstream state indicates a network resource or component that depends on the helper class's component has a high utilization of the helper class's component.

If the helper class indicates an unhealthy state, the NDF asks the helper class to provide hypotheses for components below and downstream of the component associated with the helper class. The helper class responds and the NDF evaluates the response. In one embodiment, an implication is made that the helper class's component is the problem if the helper class returns empty results for lower or downstream hypotheses.

If the helper class is healthy, the NDF determines if the helper class is highly utilized (i.e., the helper class's component is highly utilized) by asking the helper class if its component is highly utilized. If the helper class is highly utilized, the NDF asks the helper class to provide hypotheses for components below and downstream of the component associated with the helper class and above and upstream of the component. The helper class responds and indicates if there is high utilization and the NDF evaluates the response.

The NDF will walk through the helper classes in order to form a dependency tree until it reaches the last leaf of the dependency tree. Once all helper classes in the dependency tree have indicated their health, the NDF looks at the responses to determine the root cause. After a possible root cause is determined, the NDF asks if the helper classes have any resolution or workaround for the possible root cause. If a helper class responds that claimed responsibility for the problem, the NDF knows the response is a root cause resolution. If a helper class responds that indicated another component was responsible, the response is a workaround.

Once the resolution(s) or workaround(s) for the possible root cause is received, the NDF commands the helper class to run the resolution/workaround and verify that the resolution/workaround worked after permission is received from a user. After the helper class reports the success of the operation, the NDF retests components in the dependency tree and determines if all the components are healthy. If all the helper classes report their component(s) is healthy, the NDF reports to the diagnostics infrastructure that the problem has been repaired.

If all the actionable repair options have been exhausted and the problem still exists, the diagnostic infrastructure will provide the user with an escalation path, which can involve help topics as known in the art and the ability to report the problem via an error-reporting console. Escalation information is provided by the helper classes as a repair option in one embodiment. The helper classes and the diagnostics module 400 populate the error log with the results and data from the analysis.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
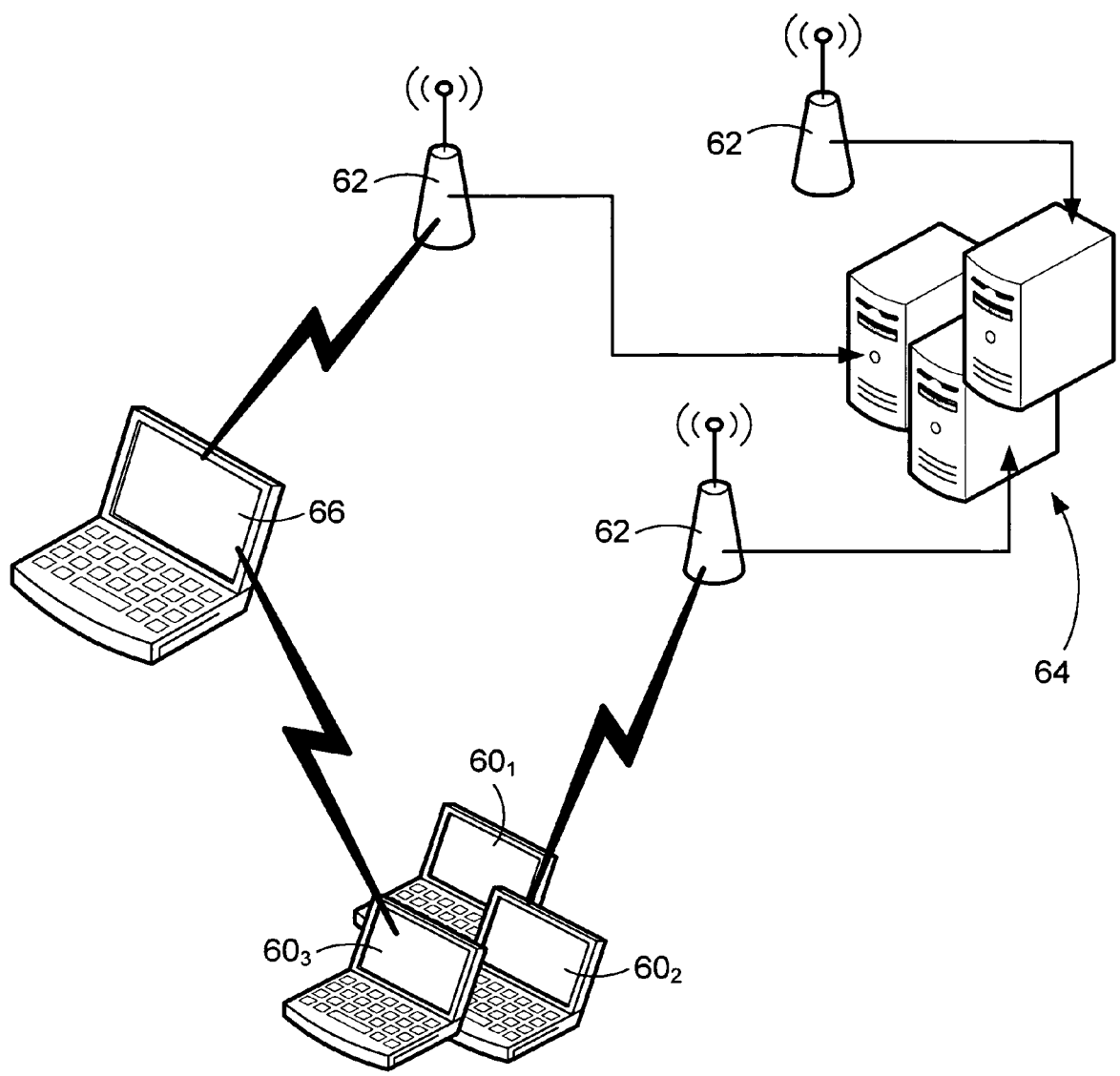
FIG. 1 is a block diagram generally illustrating an exemplary environment in which the present invention operates.

The invention provides wireless diagnostics that are non-intrusive and stay out of the way of a user. In the case of a failure, the invention provides prescriptive guidance and/or possibly automatically fixes the problem without putting the user's computer or data at risk. When a problem is not self-diagnosable or no solution is available, the user is provided seamless integration into an assisted experience or to professional assistance with all the information needed to troubleshoot the problem readily available.

As an example of how the invention works, one of biggest support call drivers is configuration issues and how-to questions. Users often do not know how to setup and configure wireless networks. While many of these issues can be avoided by improved software design, the wireless diagnostics of the instant invention can help users and support professional to find & fix configuration problems when they arise. In case of mismatch settings between a client system and a wireless Access Point, the wireless diagnostics can display to the user the current settings & settings required by the network, offer pointers, and help on how to change the settings to fix the problem. In some cases, the invention automatically fixes the settings.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

FIG. 1 illustrates an exemplary environment for implementing the invention. In FIG. 1, peers 60 (e.g., peer $60_1$, $60_2$, and $60_3$) are connected to backend servers 64 (e.g., Radius, etc.) via access points 62. The operation of a wireless network is well known and need not be discussed herein. Active diagnostics module 66 interacts primarily with local wireless modules (e.g., peers 60) and provides external interaction with the local wireless modules, which involves sending out-of-band packets (e.g., 802.11 management frames, 802.1X packets, etc.)

Figure 2:
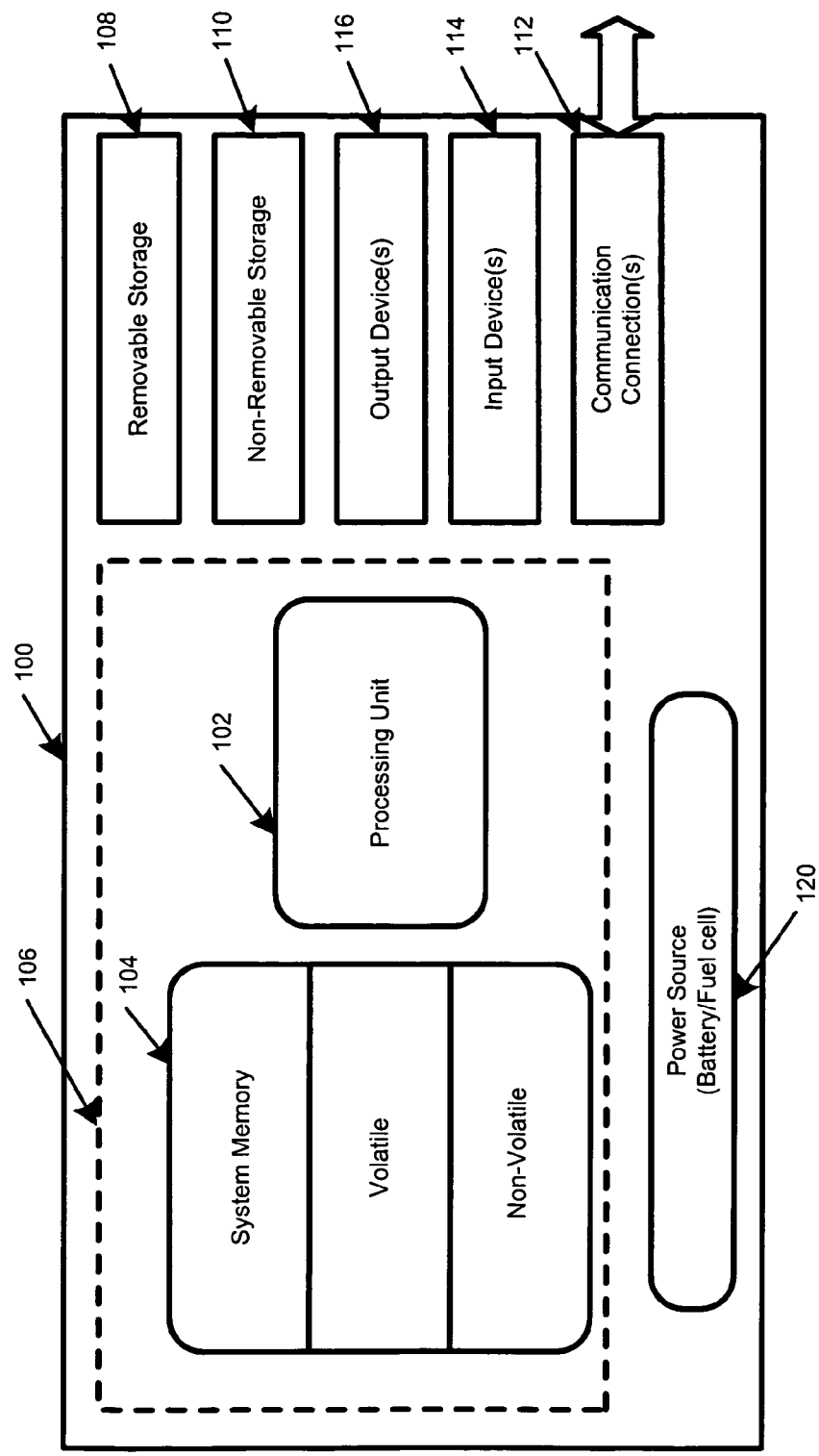
FIG. 2 is a block diagram generally illustrating an exemplary computer environment on which the present invention resides.

FIG. 2 shows an exemplary computing device 100 for implementing an embodiment of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can be accessed by the device 100. Any such computer storage media may be part of the device 100.

The device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

In keeping with the intended application of the invention, the device 100 is configured as a wireless mobile device. To that end, the device 100 is provided with a portable power source 120, such as a battery pack, a fuel cell, or the like. The power source 120 provides power for computations and wireless data transmissions by the device 100. As shown in FIG. 2, the wireless computing device 100 further includes a network interface card (NIC) 201 for wirelessly communicating with different types of wireless networks. The NIC 201 includes a transmitter 122, which is coupled to an antenna 206 for transmitting data wirelessly over a suitable frequency channel. A receiver 126 is also coupled to the antenna 206 for receiving communication packets wirelessly transmitted from the networks that the device is communicating with. The network interface module 201 and the antenna 206 are part of the communication connections 112 in FIG. 1. In one embodiment, the network interface module 201 employs wireless configuration service over the IEEE 802.11 wireless connections to ease network configuration, including infrastructure networks and ad hoc networks. An exemplary network interface module is PCMCIA wireless card. It will be appreciated that the interface type and physical configuration of the network interface module is not critical to the invention. For instance, the interface type could be PCI or another type and the network interface module does not have to reside on a separate card. It may be included on the motherboard of the computer or even possibly built into the processor in the future.

Figure 3:
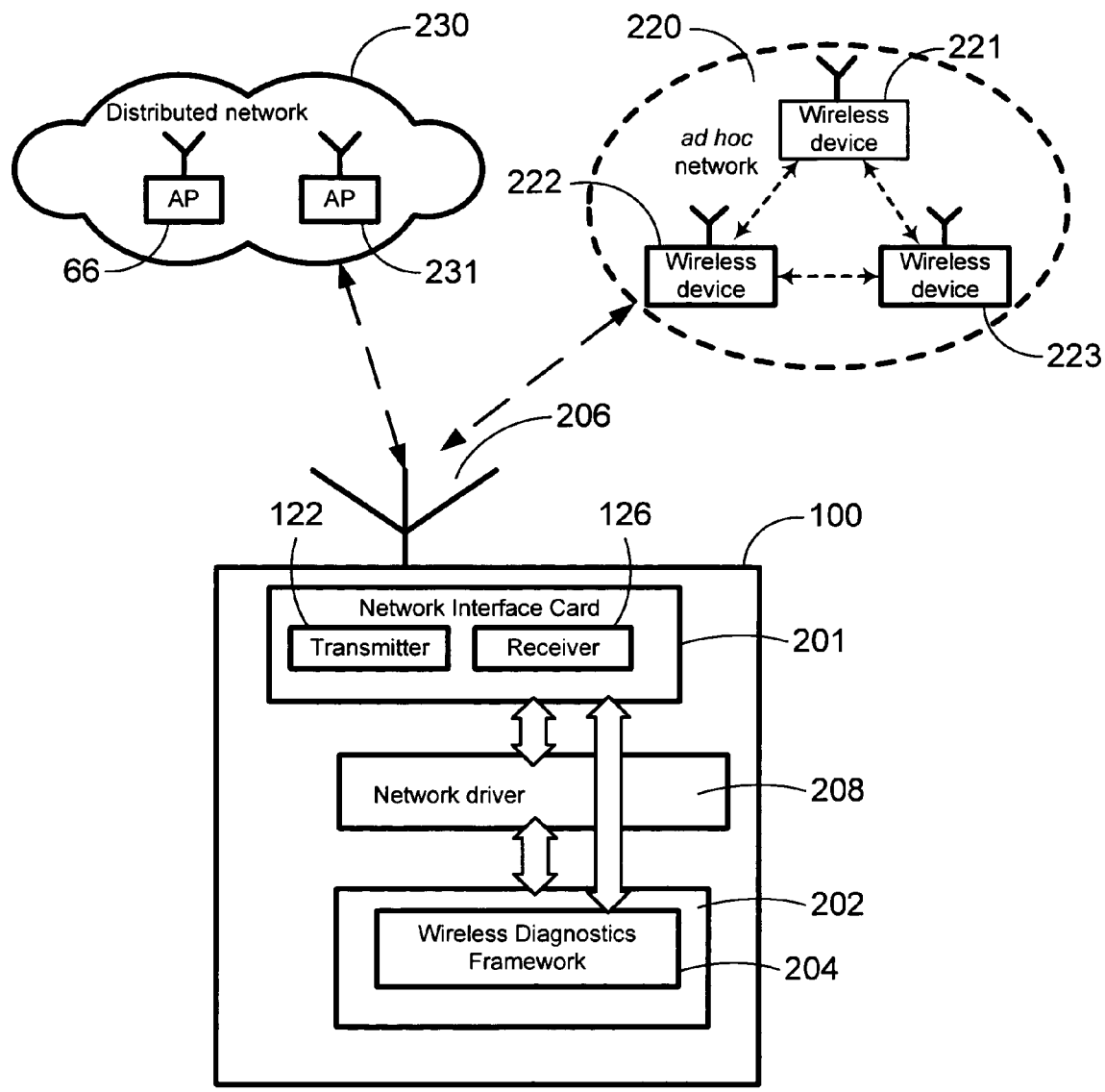
FIG. 3 is a block diagram generally illustrating further details of the environment of FIG. 1.

Through the wireless network interface module, the wireless computing device 100 may communicate with different types of wireless networks. For instance, in the illustrated environment of FIG. 3, the wireless device 100 may be connected wirelessly to an infrastructure network 230 through an access point 231 thereof. The wireless device 100 may also be part of a peer-to-peer network 220, also referred to as an ad hoc network, that includes other wireless devices, such as the wireless devices 221, 222, and 223. Before connecting to either the access point 231 of the infrastructure network or the ad hoc network 220, the wireless device 100 may be in a state of searching for devices that belong to the network by periodically scanning actively by sending probe requests and scanning for probe response signals transmitted by the access point or other devices. Alternatively, the wireless device 100 may search passively by scanning for beacons transmitted by Access Points.

A network driver 208 controls the operation of the network interface module 201. The network driver 208 is either part of the operating system of the wireless device 100 or a separate executable program running on the wireless device 100. An exemplary network driver is the NDIS intermediate driver or the Windows Management Instrument (WMI) of Microsoft Corporation. The network driver 208 is in communication with a wireless service 202, which dynamically connects to wireless networks based on the sets of available networks and configured preferred networks. The wireless service 202 includes a wireless diagnostics framework 204 in accordance with the invention as described below. The wireless service 202 and the wireless diagnostics framework 204 may reside in the system memory 104, the removable storage 108 or the non-removable storage 110 in FIG. 1. While the wireless diagnostics framework 204 and is shown as part of the wireless service, it is recognized that the wireless diagnostics framework may be separate from the wireless service, part of the operating system, or part of another module in the wireless device 100.

Figure 4:
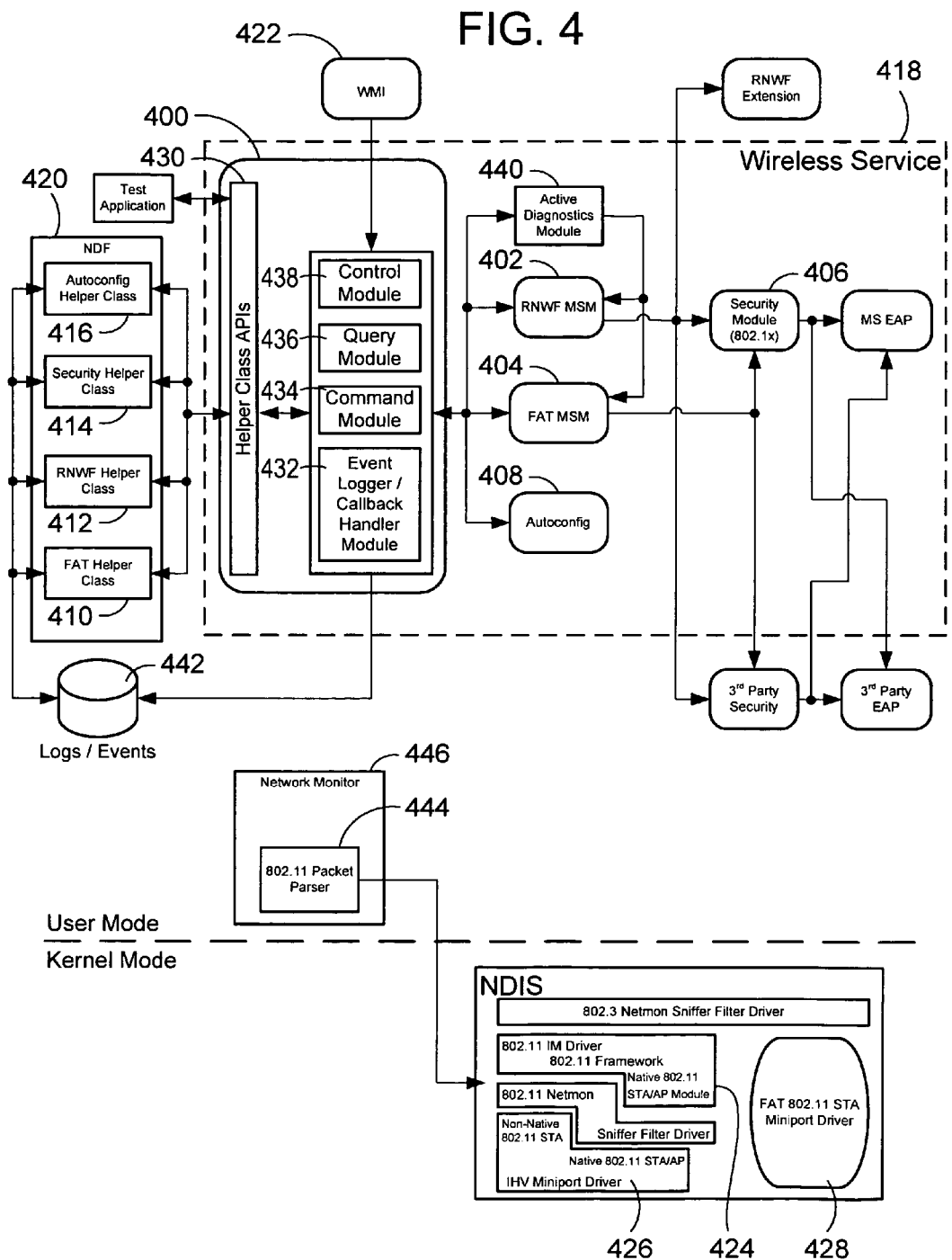
FIG. 4 is a block diagram illustrating the wireless diagnostics framework of the invention.

Turning now to FIG. 4, in one embodiment, the wireless diagnostics framework 204 includes diagnostic module 400 that interacts with 802.11 components and helper classes 410-416. These components include 802.11 media specific module (MSM) 402, 802.11 MSM for fat 802.11 stations module 404, security (e.g., 802.1X) module 406, and auto configuration service module 408. The 802.11 MSM 402 interacts with the auto configuration service 408 to drive the procedures for discovering 802.11 networks and for connecting to an 802.11 network for non-native 802.11 stations and native 802.11 stations. It enables independent hardware vendors to plug-in proprietary configuration and security functionality. The 802.11 MSM for fat 802.11 stations module 404 interacts with the auto configuration service 408 to drive the procedures for discovering 802.11 networks and for connecting to an 802.11 network for fat 802.11 stations. The security module 406 provides station side functionality for IEEE 802.1X port based network access control between two 802.11 nodes. The auto configuration service 408 is responsible for making roaming decisions between 802.11 networks. It provides common APIs (application program interfaces) through which applications can configure, store, and retrieve network profiles.

During operation, the network diagnostics framework (NDF) 420, which is part of the operating system's diagnostic infrastructure to diagnose a problem with the system, provides the framework for helper classes to communicate with the diagnostic infrastructure. A diagnosis is initiated in many ways. For example, one way is when an application detects a problem and asks the infrastructure to solve the problem. The infrastructure has a scenario map to determine from the problem which components are involved. When networking components are involved, the infrastructure invokes the NDF 420. Another way is when a system component detects a problem during operation and generates a diagnostics event. The diagnostic infrastructure maps the event and invokes NDF 420 if the event is mapped to a networking specific scenario. Another way is when a user clicks on a diagnostics specific link that generates a scenario ID. Once invoked, the NDF 420 uses its own scenario map and determines which components are involved. For example, if the problem is a wireless connectivity problem, the NDF 420 calls the appropriate helper class (e.g., one or more of helper classes 410-416) to determine if the various networking functions are healthy, whether functions or modules below a networking function is causing the problem, etc. in order to form a dependency tree to find the endpoint where the possible cause of the problem resides. Once a possible cause is determined, the NDF 420 calls an appropriate helper class (e.g., helper class 410-416) to determine if the helper class can provide a resolution.

In order to determine the health, the helper classes 410-416 call the helper class APIs 430 to interact with the diagnostics module 400, which communicates with various components to determine the state of the components and other information such as packet status bits, log entries, etc. The diagnostic module 400 collects this information during normal operation by monitoring events and logging information as it sees the need for them. A helper class is not invoked until it is called by NDF 420. A helper class goes through the relevant log entries and status information from its respective components to determine the health and determine the cause of the problem if the respective component(s) is not healthy.

The diagnostics module 400 provides functionalities and APIs for event tracing and notification in wireless components and provides various diagnostics APIs which are called by the helper classes. The diagnostic APIs 430 of the diagnostic module 400 is used internally by helper classes to retrieve diagnostic information, issue queries, and active test requests. The event logger/callback handler module 432 collects events and notifications issued by multiple components (e.g., management instrumentation 422, FAT MSM module 404, RNWF MSM module 402, security module 406, etc), and logs them at various levels, depending on whether a diagnostics session is currently active or not. This module also forwards the notifications to those helper classes which have registered their callbacks. The event listener module 432 subscribes with management instrumentation 422 to collect events and notifications issued by 802.11 Intermediate Driver 424, IHV miniport driver 426, and Fat 802.11 STA miniport driver 428.

The command module 434 provides a command-level functionality which breaks down commands from the helper classes and the test applications into more discrete and module-specific actions. The query module 436 allows the helper classes to issue query requests to 802.11 FAT MSM 404 and RNWF MSM 402 as well as to the 802.1x module 406.

The command module 438 is responsible for initializing the diagnostics modules when the wireless service is started and freeing resources when stopped. It manages the context associated with each diagnostics session so as to be able to coordinate responses to the queries and commands, and tracks callback handlers associated with the sessions. The command module 434 also tracks which wireless components are loaded and which are not, and may interact with the auto-configuration service 408 to ensure modules are not unloaded unexpectedly during a diagnosis session.

The 802.11 active diagnostics module 440 provides a mechanism for out-of-band communication at the 802.11 level to diagnose problems by allowing upper-level components to issue active packet test requests and remote diagnostics. It also allows the diagnostics engine to set up a channel via the 802.11 MSM 402. The 802.11 Active Diagnostics Module accomplishes this with the requests issued by helper classes and/or 802.11 Diagnostics Module internal logics.

A storage module (not shown) provides facilities to store, retrieve, and query diagnostics logging information by interacting with storage 442 of the diagnostic infrastructure. The 802.11 Packet Parser 444 analyzes 802.11 control, management and data packets captured by 802.11 NETMON Sniffer Filter Driver. It is embedded with the network monitor 446 and is capable of coordinating with other packet parsers including 802.1X packet parser, SNAP/LLC parser and TCP/IP parser.

When the diagnostics module 400 is not actively diagnosing problems, it is passively logging events, and reacting to certain events. One function the diagnostic module 400 performs when not actively diagnosing problems is listening for events related to the loading and unloading of modules (MSMs) by the auto configuration service 408, and registers or deregisters for events with the newly loaded/unloaded modules.

Another function performed by the diagnostic module 400 when not actively diagnosing problems is tracking each network connection attempt as it happens and keeps a cache of the results of the last "n" (most recent) connection attempts. Thus, every connect command acted on by the MSMs will result in a new entry being created in the connections cache. This entry will remain as the active entry for tracking all events occurring during the life of the connection, up to and including the disconnection from this network. The information tracked includes reason for connecting, reason for disconnecting, frequency and number of media-events during this connection, duration times for each activity during this connection (association, authentication, etc), packet statistical information, roaming, etc.

Another function performed by the diagnostic module 400 when not actively diagnosing problems is logging. From the start of a connect request (in MSMs) to the point of a successful or failed connection attempt, the diagnostics module 400 will also initiate diagnostics logging in the diagnostics infrastructure via the start/stop scenario mechanism. The information logged during this interval can be helpful in diagnosing problems that could potentially show up "after-the-fact."

The helper class 416 for the auto configuration service 408 provides troubleshooting and diagnostics by interacting with the auto configuration service 408 by choosing, detecting and establishing connectivity with an 802.11 network. The helper class provides the following functions: interaction with the auto configuration service 408 and NDF 420 to retrieve event and logging information, and issue query and active test requests for diagnostics purpose; wireless adapter management, profile/configuration validation and wireless network scanning and selection with help from the auto configuration service 408; repair cost estimation and repair; and supporting and interacting with the helper classes provided by ISVs for wireless utility applications. The target component for helper class 416 is the auto configuration service 408.

The helper classes for 802.11 include the helper class 412 for 802.11 MSM 402 and the helper class 410 for 802.11 MSM for fat stations 804. They provide a method for troubleshooting and diagnosing 802.11 wireless network connectivity via the following functions: interaction with diagnostics module 420 and NDF 420 to retrieve event and logging information, and issue query and active test requests for diagnosis; 802.11 configuration validation with the help from MSMs via the 802.11 diagnostics modules; analyzing and reporting 802.11 connectivity, health, utilization, and diagnosis status; repair cost estimation and repair; and providing extensibility for third party connectivity and/or authentication helper classes to integrate with helper class for 802.11 and NDF 420. The target components include IHV Miniport driver 426, 802.11 IM Driver 424, 802.11 MSM 402, Fat 802.11 STA miniport driver 428 and 802.11 MSM for Fat stations 404.

The helper class 414 for the security module 406 contains a set of helper classes to provide 802.1X troubleshooting and diagnostics by interacting with the diagnostics module 400. The helper classes provide the following functions: interaction with diagnostics module 400 and NDF 420 to retrieve event and logging information, and issue query and active test requests; 802.1X configuration validation with the help from 802.11 Security module via diagnostics module 400; 802.1X health status and relevant EAP authentication health status analysis; and repair cost estimation and repair. The target component is the secuirty module 406.

The general overall process for diagnosis is instantiation of a problem instance, diagnosis of the problem, repair of the problem, and completion of the diagnosis. In general, NDF 420 instantiates the appropriate helper class to diagnose the problem and call the repair methods of a helper class to attempt to resolve the problem once the problem is identified. After completion of the problem resolution and repair, the resources used are freed.

The process of instantiation of the wireless diagnostics occurs when the NDF 420 is provided a hypothesis that refers to wireless or the NDF 420 is asked to diagnose a wireless-specific scenario. The hypothesis or scenario identification is accompanied by the context for diagnosis, which includes a global and local unique identifier (GUID/LUID) for the interface and optionally the network name which is the cause of the problem. The NDF 420 invokes a helper class to start the diagnosis (i.e., the starting helper class). In one embodiment, the auto configuration helper class 416 is typically invoked first. However, if a specific component is identified as the problem or likely to be the problem, the helper class for that component is invoked first.

If the starting helper class responds that it is having a problem because of a component above or below it, it must pass back a list of dependencies for the NDF 420 to track down. Once the NDF 420 receives this list, it is responsible for building, coordinating, and following a component dependency tree. The dependency tree lists the components upstream and downstream of the component associated with the starting helper class. As each subsequent helper class is invoked and does its own assessment and determines whether it is responsible for the problem, the NDF 420 tracks the responses and continues to expand the dependency tree until all of the leaves are exhausted and one of the following situations occurs:

1) No helper class claims responsibility and no hypothesis about who is at fault are identified. In this case, the NDF 420 simply hands back the incident container and informs the operating system's diagnostic infrastructure to continue troubleshooting.

2) No helper class claims responsibility, but hypothesis about external non-networking components is identified. This typically occurs where a helper class may hypothesis a problem with memory, hard disk, performance, etc. In such a case, the NDF 420 simply hands back the incident container and hypothesis and informs diagnostic infrastructure to continue troubleshooting.

3) No helper class claims responsibility, but hypothesis about external networking components is identified. This is the case where a helper class may provide hypothesis for a problem with e.g., a $3^{rd}$ party security module or IM driver. In this case, the NDF 420 will continue troubleshooting with the helper class for the external networking component. The NDF 420 will then look for possible workarounds from within networking helper classes involved in the session to present to the user.

4) Multiple helper classes assert hypothesis about external non-networking components. In this case, the NDF 420 simply hands back the incident container and hypothesis and informs the diagnostic infrastructure to continue troubleshooting.
5) Multiple helper classes assert hypothesis about external networking components. This is the case where a helper class may provide hypothesis for a problem with e.g. a 3$^{rd}$ party security module or IM driver. In this case, the NDF 420 will continue troubleshooting with the associated helper class. The NDF 420 will then look for possible workarounds from within networking helper classes involved in the session to present to the user.
6) Multiple helper classes claim responsibility. In this case the NDF 420 will prioritize and weight the helper class claims and will choose one to report back to the user as the root cause. The NDF 420 will only report back one root cause and resolution to the user.
7) One helper class claims responsibility. The NDF 420 will only report back one root cause and resolution to the user.

In one embodiment, if a helper class finds a networking root cause, the NDF 420 will give it precedence over a non-networking hypothesis (disk/memory problem outside networking).

The helper classes are responsible for being the experts of their component area, providing accurate diagnosis of problems for the software components in which they are responsible. Helper classes inform the NDF 420 of their results by indicating if their health is Healthy or Unhealthy. The Unhealthy indication has several states. These states include LowHealth, LowHealth Below, LowHealth Downstream, HighUtilization Above, and HighUtilization Upstream.

The LowHealth state indicates that the health of the helper class's component is too low. For example, an unacceptable level of failures from the helper class's component results in a LowHealth indication. The LowHealth Below state indicates that the health of a local machine component that the helper class's component depends on is low. For example, an unacceptable level of failures from a local machine component that the helper class's component depends on results in a LowHealth Below indication. The LowHealth Downstream state indicates that the health of a network destination or component the helper class's component relies upon is too low. For example, an unacceptable level of failures from a network destination or component that is depended on results in a LowHealth Downstream indication.

The HighUtilization state indicates that the utilization of the helper class's component is too high (i.e., is demanding too many resources.) For example, an unacceptable level of timeouts from the helper class's component results in a HighUtilization indication. The HighUtilization Above state indicates a component of a local machine that depends on the helper class's component has a high utilization of the helper class's component. For example, an unacceptable level of resource requests from a local machine component that depends on the helper class's component results in a HighUtilization Above indication. The HighUtilization Upstream state indicates a network resource or component that depends on the helper class's component has a high utilization of the helper class's component. For example, an unacceptable level of resource requests from a network resource or component that depends on the helper class's component results in a HighUtilization Upstream indication.

The key differentiators are low health/high utilization and above/below/downstream/upstream. NDF 420 will ask the helper class questions to determine its health state. These questions are designed to help the NDF 420 determine the problem that is being experienced and where to look next for diagnosis and resolution. To the extent possible, each helper class must be able to answer the questions of "lowhealth" and "highutilization" to better direct diagnostics activities. NDF 420 starts by asking a helper class "are you experiencing low health?" If the response is yes, then NDF 420 asks "Can you generate hypotheses for lower components?", "Can you generate hypotheses for downstream components?", etc. If the response is no, then the NDF 420 asks "are you experiencing high utilization?" If the response is yes, then the NDF 420 asks "Can you generate hypotheses for higher components?", "Can you generate hypotheses for above/upstream components?" etc. If no hypotheses are generated, NDF 420 implicitly assumes that the cause is within the component associated with the helper class.

Helper classes also participate in the process of creating the dependency tree. The helper classes participate by informing NDF 420 which helper classes and their associated modules are involved either below or above them in a given transaction (hypotheses) or let NDF 420 know their component is the source of the problem (i.e., the helper class provides no hypotheses).

Figure 5:
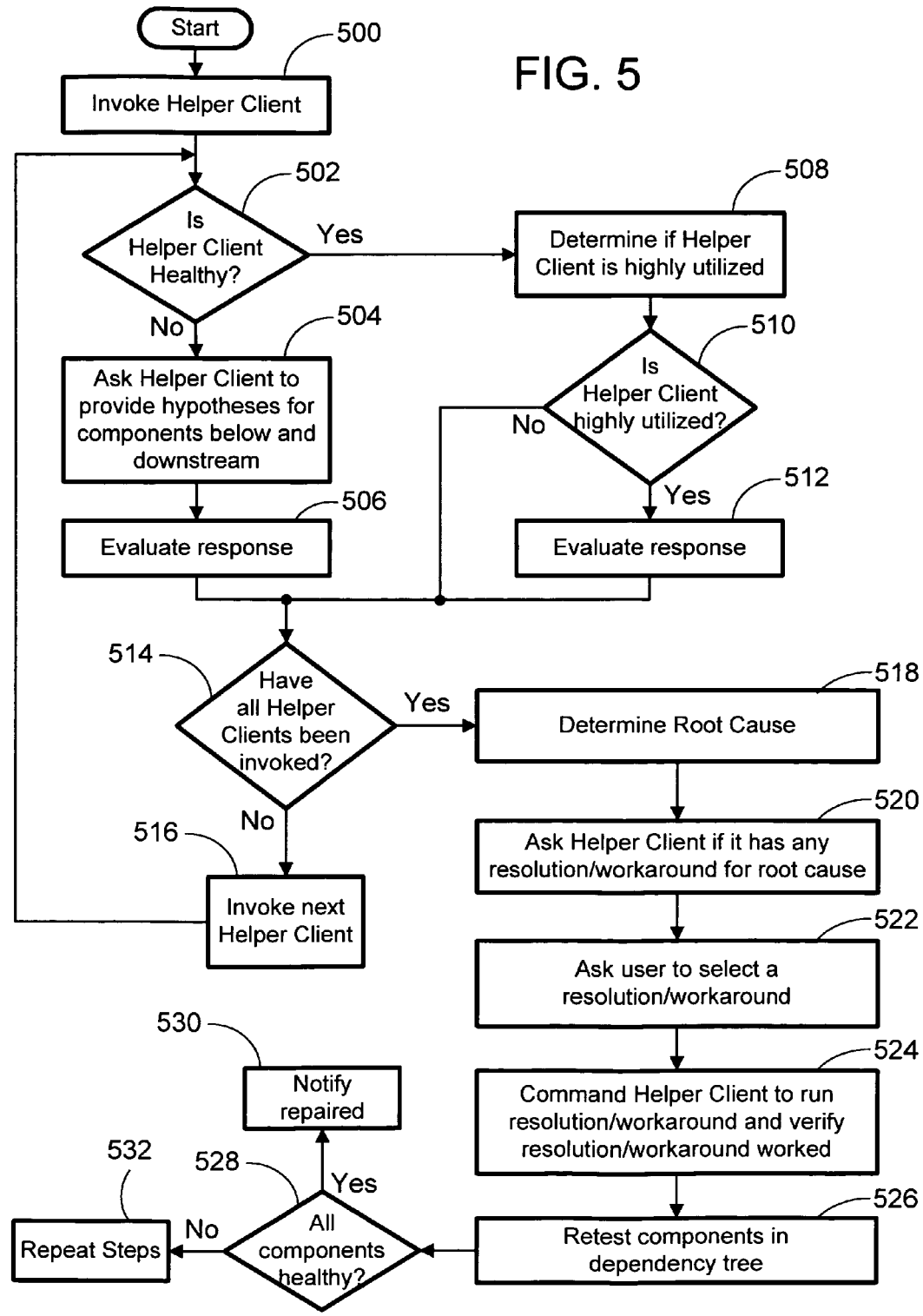
FIG. 5 is a flowchart illustrating the steps the invention performs to diagnose and repair a wireless problem in accordance with the teachings of the present invention.

If the helper class identifies the source of the problem in its component (root cause), or potential problem in related components, it informs NDF 420 of the results by indicating the resolution or workarounds in the following ways:
1) Resolution available for identified root cause
2) No resolution available for identified root cause
3) Workaround available for identified dependency
4) No workaround available for identified dependency The steps the NDF 420 takes are illustrated in FIG. 5. The starting helper class is invoked (step 500) and the NDF 420 asks if the helper class is healthy (i.e., if the component associated with the helper class healthy) (step 502). The helper class calls into the helper class APIs 430 to create a new diagnostics session. During this call, the control module 438 will create the context for this diagnostics session and link it to other helper class's sessions for the same problem to provide a single consolidated space within wireless for all helper classes diagnosing the same problem. The NDF 420 will then query the health of the helper class with respect to the session being diagnosed. The Helper class will in turn use the diagnostics module 400 to query the health of the component and arrive at a result. In certain cases, the helper class may also issue commands via the diagnostics module 400 to verify the problem. For example, the security helper class 414 could send out certain 1x packets to "probe" for mismatched configuration issues. The helper class may also query recent logs. If the diagnosis is confirmed, the helper class will return the confirmed status and a string containing a brief description of the problem. The 420 NDF will then call the helper class to provide a list of hypotheses (step 504). If the root-cause of the problem lies in the diagnosed component itself, no hypotheses will be returned, whereas if the root-cause is in other components, then the hypothesis will refer to those components. The helper class responds and the NDF 420 evaluates the response (step 506). The response is an indication of LowHealth, LowHealth Below, or LowHealth Downstream. In one embodiment, an implication is made that the helper class's component is the problem if the helper class returns empty results for lower or downstream hypotheses.

The NDF 420 may also determine if the helper class is highly utilized (i.e., the helper class's component is highly utilized) (step 508) by asking the helper class if its component is highly utilized (step 510). If the helper class is highly utilized, the NDF 420 asks the helper class to provide hypotheses for components below and downstream of the component associated with the helper class and above and upstream of the component. The helper class responds and indicates if there is high utilization and the NDF 420 evaluates the response (step 512). The response if there is high utilization is an indication that includes HighUtilization, HighUtilization Above, or HighUtilization Upstream.

The NDF 420 will walk thru the helper classes in order to form the dependency tree until it reaches the last leaf (by repeating steps 502-516) by continuing to invoke helper classes until there are no more hypothesis generated for new helper classes. Once all helper classes in the dependency tree have indicated their health, the NDF 420 proceeds to ask the helper classes for resolutions or workarounds and looks at the responses to determine the root cause (step 518). Once the diagnosis is complete and root-causes identified, the NDF 420 will start attempting to resolve the problem by calling each helper class to solicit a list of repair options to be presented to the user (step 520). Some of the repair options may involve directing the user directly to the wireless configuration UI with an explanation of the problem, and instructions for repairing. Others may simply provide an explanation of the problem with instructions on following up if the component is unable to resolve the problem itself. If a helper class responds that claimed responsibility for the problem, the NDF 420 knows the response is a root cause resolution. If a helper class responds that indicated another component was responsible, the response is a workaround.

Once the resolution(s) or workaround(s) for the possible root cause is received, the NDF 420 asks the user to select a resolution/work around to run (step 522). The NDF 420 then commands the helper class to run the resolution/workaround and verify that the resolution/workaround worked (step 524). The helper class will apply the changes and retest the configuration to see if the problem is resolved. After the helper class reports the success of the operation, the NDF 420 retests components in the dependency tree (step 526) and determines if all the components are healthy (step 528). If all the helper classes report their component(s) is healthy, NDF 420 reports to the diagnostics infrastructure that the problem has been repaired (step 530).

In one embodiment, if all components are not healthy, steps 500-530 are repeated (step 532). In an alternate embodiment, the user will be asked to choose from the remaining list of options to attempt to repair the problem. The NDF 420 will repeat steps 524-530 with the selected option. If the chosen repair option fails for any reason, the Repair method will return an error and the NDF 420 will ask the user to choose from the remaining list of options to attempt to repair the problem. The NDF 420 in turn commands a helper class to run a repair with the requested repair option. If all the actionable repair options have been exhausted and the problem still exists, the repair will be marked as failed and the NDF 420 and/or the diagnostic infrastructure will provide the user with an escalation path, which can involve help topics as known in the art and the ability to report the problem via an error-reporting console. The helper classes and the diagnostics module 400 populate the error log with the results and data from the analysis.

Figure 6:
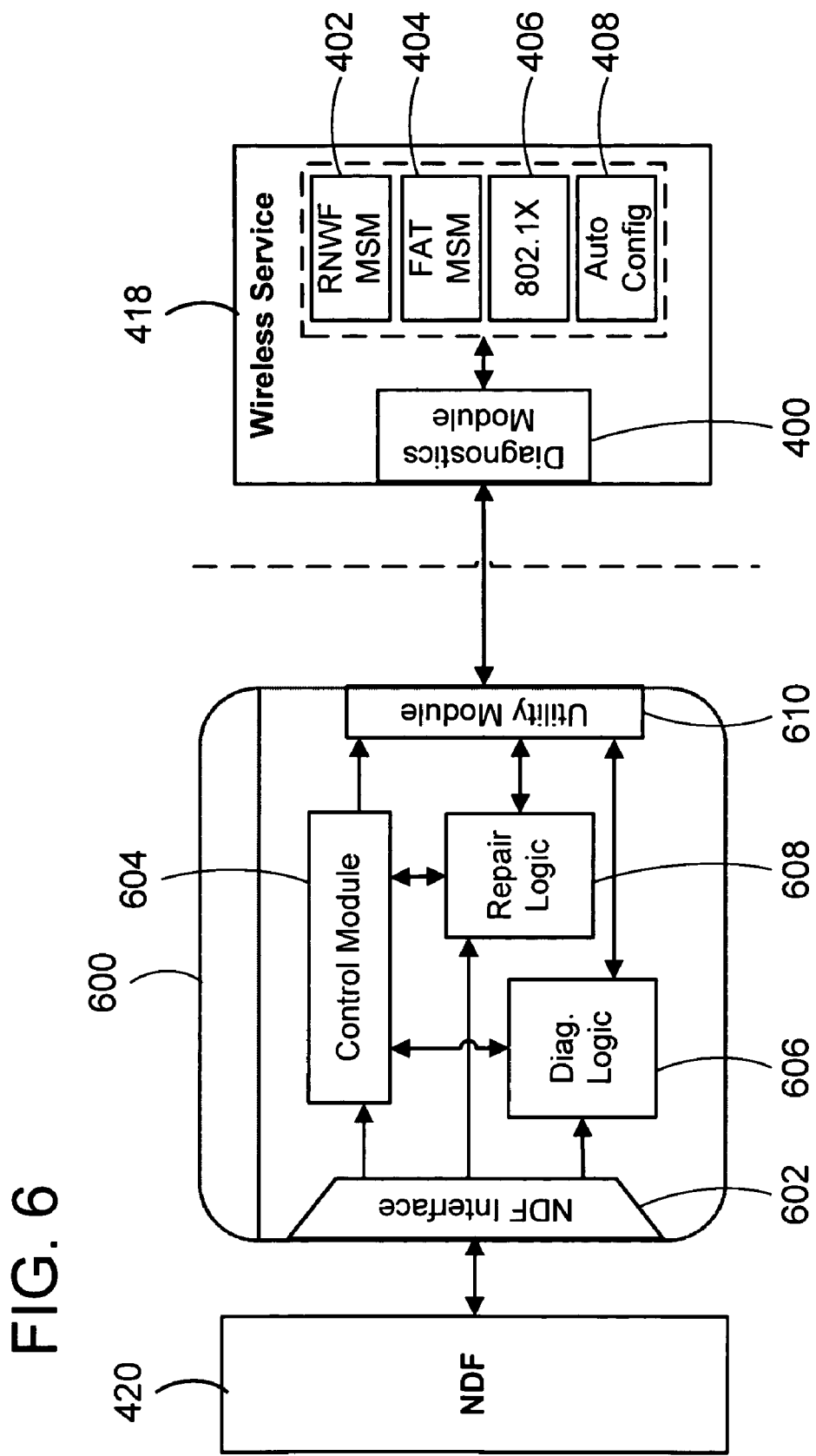
FIG. 6 is a block diagram illustrating the structure of a helper class in accordance with the teachings of the present invention.

Now that the overall steps have been described, the structure of a helper class and the steps each helper class makes shall be described. Turning now to FIG. 6, a helper class 600 (e.g., helper classes 410-416, etc.) contains an NDF interface 602, a control module 604, diagnostics logic module 606, repair logic module 608, and utility module 610. The NDF interface module 602 implements interfaces required by the NDF 420. It also distributes the methods calls from the NDF 420 to appropriate internal modules.

The control module 604 performs helper class initialization/de-initialization routines, manage resources such as session handles and event handle registration/deregistration. It also maintains runtime diagnostics context information for a helper class instance. The diagnostics context information includes helper class attributes, information acquired from logs and wireless components, intermediate diagnosing/repairing status and results, helper class dependency information. In addition, the control module 604 resolves and provide extensible helper class information in its dependencies to the NDF 420.

The diagnostics logic module 606 implements intelligence to determine wireless component health status, identify problem type (e.g., LowHealth/HighUtilization), diagnose wireless incidents to determine root causes, and generate hypothesis. It uses context information and facilities provided by the utility module 610.

The repair logic module 608 implements intelligence to give repair or workaround options for a specific wireless incidents, perform the repair operation and provide retest if appropriate. It uses context information and facilities provided by the utility module 610.

The utility module 610 provides API utilities for the control module 604, the diagnostics logic module 606, and the repair logic module 608. The APIs include query, set and command APIs to the wireless diagnostics module 400.

Figure 7:
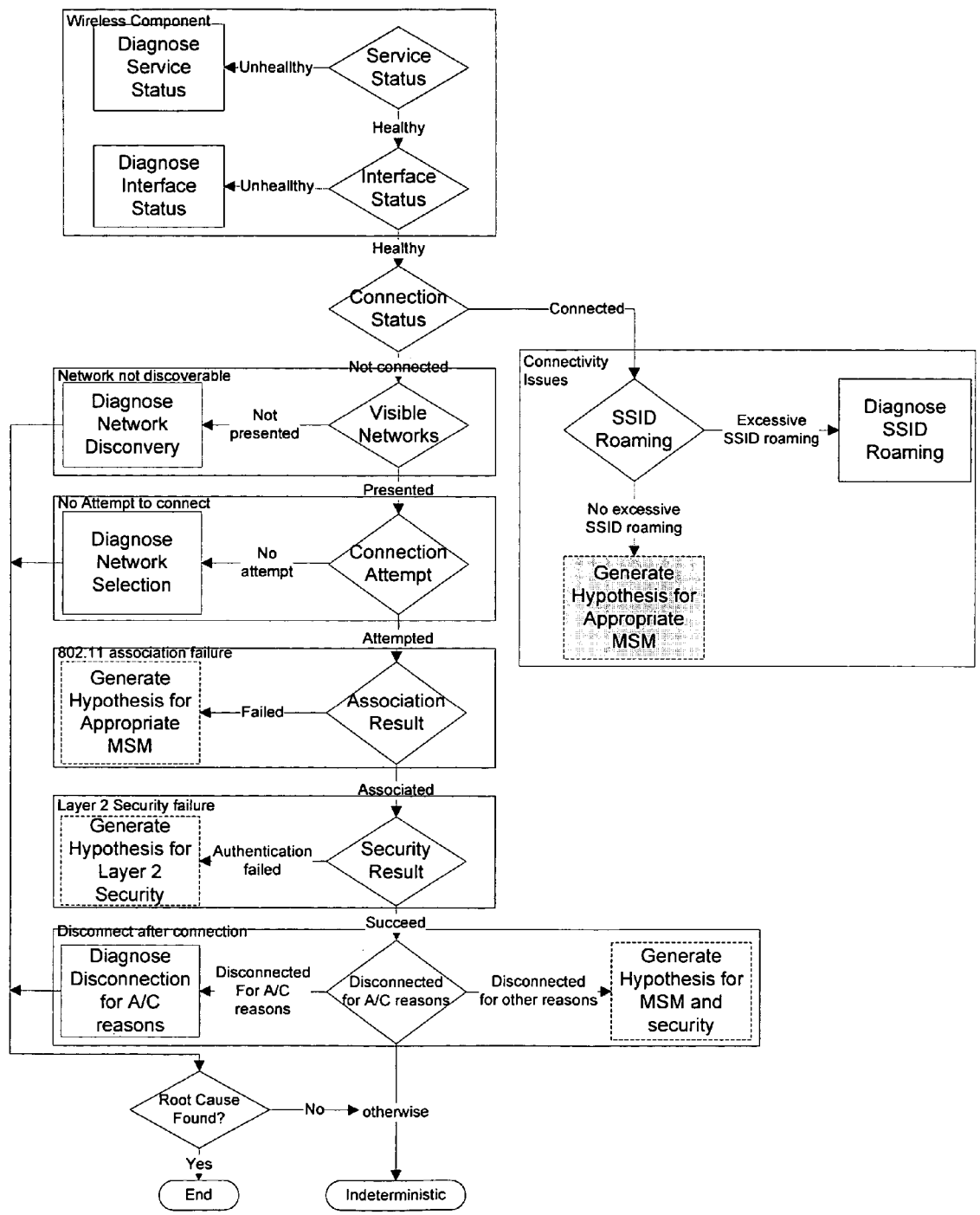
FIG. 7 illustrates a decision tree a helper class for an auto configuration service takes to diagnose the auto configuration service's health and provide hypotheses in accordance with the teachings of the present invention.

Turning now to FIG. 7, the auto configuration helper class 416 diagnoses and repairs problems occurring within auto configuration operations, including auto connection logic enable/disable, wireless interface management, 802.11 network discovery, profile management and 802.11 network selection, 802.11 network connection, and roaming between 802.11 networks.

The auto configuration helper class 416 is the entry point for diagnosing 802.11 related problems. It can be invoked by the user and by upper layer helper classes. The user launches a wireless diagnostics process through user interfaces, which in turn notifies the NDF 420 to launch the auto configuration helper class 416 directly. An upper layer helper class invokes the auto configuration helper class 416 when it determines wireless as one of it hypothesis by notifying the NDF 420. The NDF 420 then launches the auto configuration helper class 416. For example, a helper class for NDIS is an upper layer helper class that depends on the auto configuration helper class 416.

The NDF 420 needs to pass an interface ID and an 802.11 network name. The Interface ID is passed from the parent helper class or diagnostics initiator. It must be a value that uniquely identifies an 802.11 interface on the local machine. The 802.11 network name is passed from the diagnostics initiator and it is a value that uniquely identifies an 802.11 network in which the interface wants to connect. If a value is present, the helper class will diagnose and repair under the context of connection to the particular 802.11 network. If no value is present, the helper class will diagnose and repair by focusing on connection to any 802.11 network.

The auto configuration helper class 416 needs to determine the healthy status of the 802.11 connection on an interface. If the conclusion is healthy, then it will return healthy to NDF and will not drill down the problem to any underlying helper classes or give out any hypothesis. The helper class determines the healthy status of an 802.11 interface based on the conditions listed below. If any condition is not met, the helper class returns an unhealthy status to the NDF 420. The auto configuration helper class 416 opens a session handle to start a wireless diagnostics transaction. The diagnostics module 400 ensures there is only one session per interface at a time. As a result, if the next helper class instance tries to open more handle on the same interface, the call will fail and helper class instance will defer the diagnostics request. The conditions are: 1) The auto configuration service 408 is loaded and enabled; 2) The interface exists and is connected with a desired 802.11 network; 3) The interface has a stable connectivity with the connected 802.11 network; and 4) The interface does not have thrashing problem in recent history.

"Connected" as used above is defined as the interface is associated with the network, and the security procedure is passed (if authentication is enabled, then port status is controlled and authorized, otherwise, port status is not controlled). If a key attribute of "802.11 network name" is a non-NULL value, then the connected network must be the same as the one given by the key attribute. Otherwise, the connected network can be any 802.11 network.

A stable connectivity must meet the following requirements: packet transmission and reception is happening; packet transmission retry rate is within a threshold; packet reception CRC error rate is within a threshold; and packet reception decryption error rate is within a threshold.

A thrashing problem is one of the following situations: excessive roaming between different 802.11 wireless networks: auto configuration drives the interface to connect to disconnect from a limited number of 802.11 networks; excessive roaming within the same 802.11 wireless networks: the interface makes a large number of roaming between a limited number of APs (2 to 3) within a short amount of time.

Wireless problems are categorized into several types based on the operation sequence. Based on the symptoms and root causes, the auto configuration helper class 416 can diagnose issues with root causes that can be identified within auto configuration helper class 416 and help to give out hypotheses. The issues include wireless component issues, network discovery issues, no attempt to connect, and connectivity issues. The auto configuration helper class 416 can help to give out hypothesis, and the potential dependencies for the following issues: no attempt to connect (part): MSM/Security; association failures: MSM; layer 2 security failures: Security; Connectivity issues (part): MSM; disconnected for 802.11 issues: MSM; and disconnected for security issues: Security.

FIG. 7 describes a decision tree for diagnosing the above issues. Based on the nature of a problem, the decision tree either identifies the root causes, or gives out hypothesis containing its dependencies. The Service Status checks whether the service is loaded and started correctly by opening a session handle to core diagnostics module and checks if the auto connection logic is enabled by query the service status. The Interface Status checks if the interface is presented and enabled, and checks whether it is a wireless adapter and radio is turn on. The helper class does so by querying interface status.

The Connection Status checks whether the interface is experiencing a connectivity issue. If the interface is connected with a network or the specified network if the network name is provided as an attribute from A/C HC through NDF, then it might be a connectivity issue. Other wise, it is some other issue. The helper class check the connection status by querying interface status and wireless network status. The Visible Networks checks if there is any visible network and whether the desired network is in the visible list if a network name is specified as key attribute. The helper class does so by querying visible network list. The Diagnose Network Discovery diagnoses the root cause for network discovery issue due to no network in range or bad signal quality. The helper class queries signal quality, statistical counters and visible network list.

The Connection Attempt checks if there is a matched profile selected for a network or the specific network if network name is provided, and connection is attempted for that network. The helper class queries the cached connection context information or logging information from the core diagnostics module to check whether there is an attempt to the specific network. The Diagnose Network Selection (connection attempts) diagnoses the root cause for network discovery issue due to: no network in preferred list; no preferred networks in range; network is in denied list, failed list or block list; mismatch between network profile and NIC capabilities; and mismatch between network profile and AP capabilities. The helper class 416 may query the following lists: Visible list, preferred list, block list, fail list and denied list from context information in the diagnostics module 400. In addition, the helper class may also retrieve profile matching results, last good profile, and network status info.

The Association Result checks if the interface has passed association and indicated associated state with the chosen network. If there is failure, hypothesis to the appropriate MSM helper class or third party helper class is generated. For both RNWF and Fat cases, the helper class 416 retrieves the association result from the cached connection context information in the core diagnostics module or logging information. The core diagnostics module always marks the association result as either success or failure in its cached context information and logging information when corresponding event is indicated from MSM.

The Security Result checks if the interface has passed security process (authentication and key exchange) with the chosen network if security is enabled. Otherwise, it checks if the interface port is set as uncontrolled. The helper class 416 retrieves the security result from the cached connection context information in the diagnostics module 400 or logging information. The diagnostics module 400 always marks the security result as either success or failure in its cached context information and logging information when corresponding port event is indicated from security module. If there is a failure, hypothesis to the appropriate MSM helper class or third party helper class is generated.

The Disconnected for A/C reasons checks if the established connection was disconnected either because of request from local client or from AP. The helper class 416 checks the disassociation events from the cached connection context information in the diagnostics module 400 or logging information. The diagnostics module 400 always marks the disassociation events in its cached context information and logging information when the disassociation events happen. If the disconnection is for an auto configuration reason, the root cause is diagnosed; otherwise, a hypothesis is generated for helper class for appropriate MSM and Layer 2 Security helper classes.

The Diagnose Disconnection for A/C issues diagnoses the root causes for disconnection after successful connection due to the following auto-configuration reason: disconnected by user/third party applications through Auto Configuration API.

The SSID Roaming checks if there is excessive roaming among different SSIDs. A threshold for roams per minute is defined for excessive SSID roaming. If there is no excessive SSID roaming, hypothesis are generated for appropriate MSM helper class. The helper class 416 queries the historical connection statistical information about number of roaming and connection time from the cached connection context information in the diagnostics module 400.

The Diagnose SSID roaming diagnoses excessive roaming due to various reasons such as low signal quality. Diagnosis of a detailed root cause requires extra information such as roaming reasons. That information may or may not available in fat driver model.

The helper class 416 queries the current connection statistical information about number of roaming, connection time, and roaming (disconnection) reasons from the cached connection context information in the diagnostics module 400.

The auto configuration helper class 416 maintains a repair option table for all possible repair options and workarounds for the auto configuration service 408. Each entry in the table uniquely identifies a repair method and contains the following information: repair ID; repair message; repair link/operation (function pointer). The helper class 416 maintains a root cause—repair option table. Each root cause has a unique ID. The table maintains matching repair options for each possible root cause within the auto configuration service 408. During the diagnostics process, if a root cause is identified by the auto configuration helper class 416, the diagnostics logic module records the root cause ID into the runtime diagnostics context for later reference. When the NDF 420 asks auto configuration helper class 416 for repair options, the repair logic module identifies the matching repair option Id from the root cause—repair option table. It then saves the repair ID into the runtime diagnostics context, and retrieves and returns the corresponding repair message to the NDF 420. If the NDF 420 chooses the repair option and asks the auto configuration helper class 416 for repair, the Repair Logic gets the repair ID from the runtime diagnostics context and performs the repairing by using the repair link/operation.

The helper class also maintains a hypothesis—workaround table. For each type of hypothesis, a unique ID is defined. The table maintains matching workaround for each possible hypothesis that the auto configuration helper class 416 generates. A workaround is a repair option in the repair option table. During diagnostics, if the diagnostics logic module determines the root cause is not within the auto configuration service 408, it generates a hypothesis for one or more of its dependencies. At the same time, it saves the hypothesis ID into the runtime diagnostics context. When the NDF 420 asks the auto configuration helper class 416 for workarounds, the repair logic module identifies the matching workarounds ID from the hypothesis—workaround table. The repair logic module also saves this workaround ID into the runtime diagnostics context and retrieves the corresponding workaround message and returns it to the NDF 420. If the NDF 420 chooses the workaround and asks the auto configuration helper class 416 for repair, the repair logic module gets the repair ID from the runtime diagnostics context and performs the repairing as a workaround by using the repair link/operation.

After a repair or workaround action has been completed, the NDF 420 commands each helper class in the diagnostics dependency link from bottom to top level to validate the repair. Verification should be performed only after the repair or workaround is completed. If a repair or workaround is to ask user to perform certain operations, such as change configuration settings, the NDF 420 should ensure that the user operation is finished before the NDF 420 calls the helper class for verification. The verification process will perform the following actions. The healthy status of auto configuration 408 is determined. If the auto configuration 408 is healthy, then return the status to the NDF 420. Otherwise, it performs a reconnection operation (asynchronized operation) through API to wireless components and then again determine the healthy status of the auto configuration 408 by following the steps described above. The validation process must be cancelable when trying reconnection.

The diagnostics logic, repair logic and validation routines are all cancelable during operation. The control module 604 processes an incoming cancel call from the NDF 420 and sets the cancel flag in the helper class context. Based on the current operation, the control module 604 will call cancel diagnosing routine or the cancel repairing routine. The diagnostics, repair or validation cancel routine will cancel the pending asynchronized call if there are any. For each major step during diagnostics or repair, the routine checks the cancel flag in the context. If the flag is set, then the routine will exit consequential diagnostics or repair steps and return cancel status to the NDF.

Figure 8:
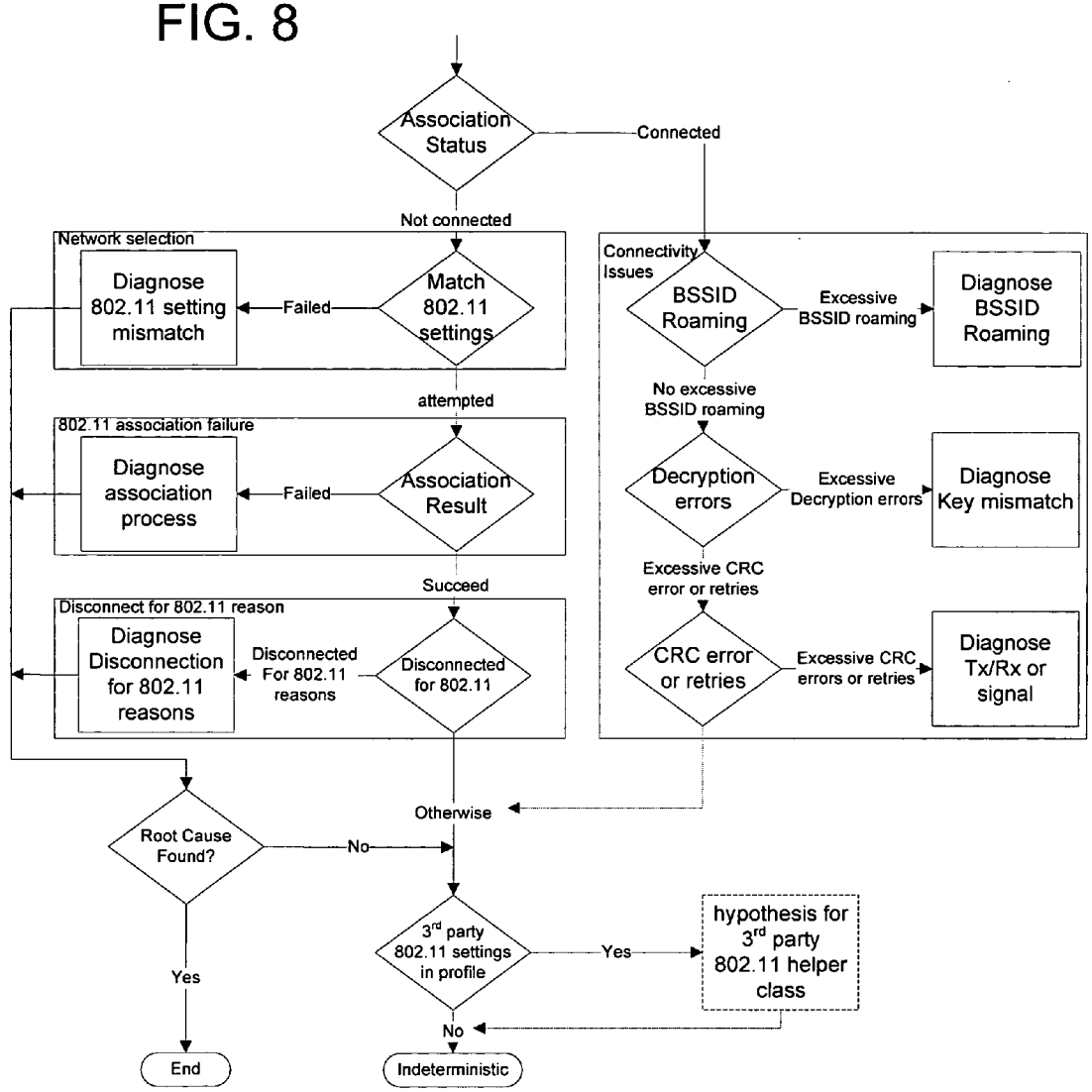
FIG. 8 illustrates a decision tree a helper class for a media specific module takes to diagnose problems occurring within an 802.11 connection in accordance with the teachings of the present invention.

Turning now to FIG. 8, the RNWF MSM helper class 412 diagnoses and repairs problems occurring within an 802.11 connection including profile management (802.11 portion); 802.11 association; roaming within an 802.11 network; and 802.11 network connectivity.

The RNWF MSM helper class 412 is launched by the auto configuration helper class 416 via the NDF 420. It can not be invoked by external diagnostics initiator directly. In this case, the NDF 420 needs to pass the following key attributes to the helper class: Interface ID passed from the auto configuration helper class 416 and 802.11 network name. The Interface ID must be a value that uniquely identifies an 802.11 interface on the local machine. The 802.11 network name is passed from the auto configuration helper class 416. The 802.11 network name is a value that uniquely identifies an 802.11 network to which the interface wants to connect. If a value is present, the helper class will diagnose and repair connectivity under the context of the particular 802.11 network.

The RNWF MSM helper class 412 determines the healthy status of the connection to a particular 802.11 network on an interface. If the conclusion is healthy, then it will return healthy to the NDF 420 and will not drill down the problem to any underlying helper classes or give out any hypothesis. The RNWF MSM helper class 412 always opens a session handle to start a wireless diagnostics transaction. The diagnostics module 400 ensures there is only one session per interface at a time so that if the next helper class instance tries to open more handles on the same interface, the call will fail and helper class instance will defer the diagnostics request. The helper class 412 determines the healthy status based on the conditions listed below. If any condition is not met, the helper class bails out the procedure and returns unhealthy to NDF.

The first condition is that the interface exists and is associated with a desired 802.11 network. "Associate" means the interface successfully performed an 802.11 association with an AP in the wireless network. The connected network must be the same as the one given by the key attribute and the corresponding port up event is indicated.

The second condition is that the association maintains a good connectivity. This occurs when packet transmission CRC error rate and retry rate are within certain thresholds and packet reception decryption error rate is within a threshold.

The third condition is that the interface does not excessive roaming within the same 802.11 wireless network. Excessive roaming means that the interface makes a large number of roams between a limited number of APs (2 to 3) within a short amount of time. The threshold will be defined for a number of roams.

FIG. 8 illustrates a decision tree for diagnosing the above issues. Based on the nature of a problem, the decision tree either identifies the root causes, gives out hypothesis containing its dependencies, or returns undetermined if no root cause or hypothesis could be identified.

The Association Status checks whether the interface is experiencing an association issue. If the interface is associated with the specified network, then it might be a connectivity issue. Otherwise, it is some other issue. The helper class checks the current connection status by querying interface status and wireless network status.

The Match 802.11 settings checks whether there is a mismatch in MSM setting section among network profile, interface capabilities and visible wireless network to be connected. Group Policy settings might also be matched. The helper class checks cached network match result returned by wireless component.

The Diagnose 802.11 Setting Mismatch finds the root cause for 802.11 setting mismatch. This process finds out the first mismatch MSM settings and the root cause will contain the following information: components that are mismatched among profile settings, interface capability and network capabilities; and mismatched 802.11 MSM setting. Wireless components have defined a detailed set of reason codes for mismatched settings. Upon a mismatch during either network discovery or connection attempt, the wireless components will notify the diagnostics module 400 to mark this error in cached connection context information and logging information. In turn, the helper class 412 checks network match result from cached context information or logging information from the diagnostics module 400.

The Association Result checks whether the interface has passed association and indicated port up event. If there is a failure, the association process is diagnosed. The helper class 412 retrieves the association result from the cached connection context information in the diagnostics module 400 or logging information. This check only needs to determine whether the association is successful.

The Diagnose Association Process diagnoses the root causes for 802.11 association failure due to various association failure reason codes returned by AP (codes are defined by IEEE specs) or signal quality. During association, the helper class tracks the events during association and result from the cached connection context information in the diagnostics module or logging information.

The Disconnected for 802.11 Reasons checks whether the interface has disconnected after passing association process and indicated port up event. If it is disconnected, then the root cause is diagnosed. The helper class retrieves the disassociation reason code from the cached connection context information in the core diagnostics module or logging information. This check only needs to determine whether there a disassociation happened.

The Diagnose Disconnection for 802.11 Reasons checks if the established connection was disconnected either because of request from local client or from AP due to 802.11 reasons. The helper class 412 retrieves the disassociation events and reason code from the cached connection context information in the diagnostics module or logging information. The diagnostics module 400 always marks the disassociation events in its cached context information and logging information when the disassociation event happens. If the disconnection is for an 802.11 reason, the root cause is diagnosed. The reason codes are defined by IEEE 802.11 specifications.

The BSSID Roaming checks if there is excessive roaming among BSSIDs within the same SSID. A threshold for roams per minute is defined for excessive BSSID roaming. The helper class 412 queries the statistical information for current connection about number of BSSID roaming and connection time from the cached connection context information in the diagnostics module 400.

The Diagnose BSSID Roaming diagnoses excessive BSSID roaming due to various reasons such as low signal quality. The diagnosis of a detailed root cause requires extra information such as roaming reasons. The diagnosis will be interested in reason for the last roam within the SSID. The helper class 412 queries the current connection statistical information about number of BSSID roams, connection time, and roaming reasons from the cached connection context information in the diagnostics module 400.

The Decryption Errors check if there are decryption errors for current connection. A threshold for decryption error rate is defined. The helper class 412 queries the statistical information for current connection about decryption error ratio from the cached connection context information in the core diagnostics module or query API.

The Diagnose Key Mismatch diagnoses decryption errors due to Unicast (pairwise) key mismatch and multicast/broadcast (group) key mismatch. The helper class 412 queries the decryption error ratios for different traffic types in the current connection through either the cached connection context information in the diagnostics module 400 or query API.

The CRC Errors or Retries checks if there are high ratios for frame checksum (CRC) errors and packet retries. The helper class 412 queries the statistical information for CRC errors and retries from the cached connection context information in the diagnostics module or query API.

The Diagnose Transmission/Reception Problems diagnose transmission/reception problems due to bad signal quality in interface or from AP, and environmental signal interference. The helper class 412 queries the statistical information for CRC errors and retries from the cached connection context information in the core diagnostics module or query API. It also retrieves other information such as signal quality.

The RNWF MSM helper class 412 generates a hypothesis containing key attributes for $3^{rd}$ party helper classes if there are $3^{rd}$ party settings defined in the profile. The RNWF MSM helper class 412 retrieves the $3^{rd}$ party key attribute from the wireless component. It passes this information as well as the extensible helper class name to the NDF 420. The NDF 420 in turn searches for the appropriate $3^{rd}$ party binary in its registration table. If one is found, the NDF launches the helper class in a separate process.

The repair logic, validation logic, and cancel operation in the RNWF MSM helper class 412 follows the same design and methods described above in the auto configuration helper class 416.

Figure 9:
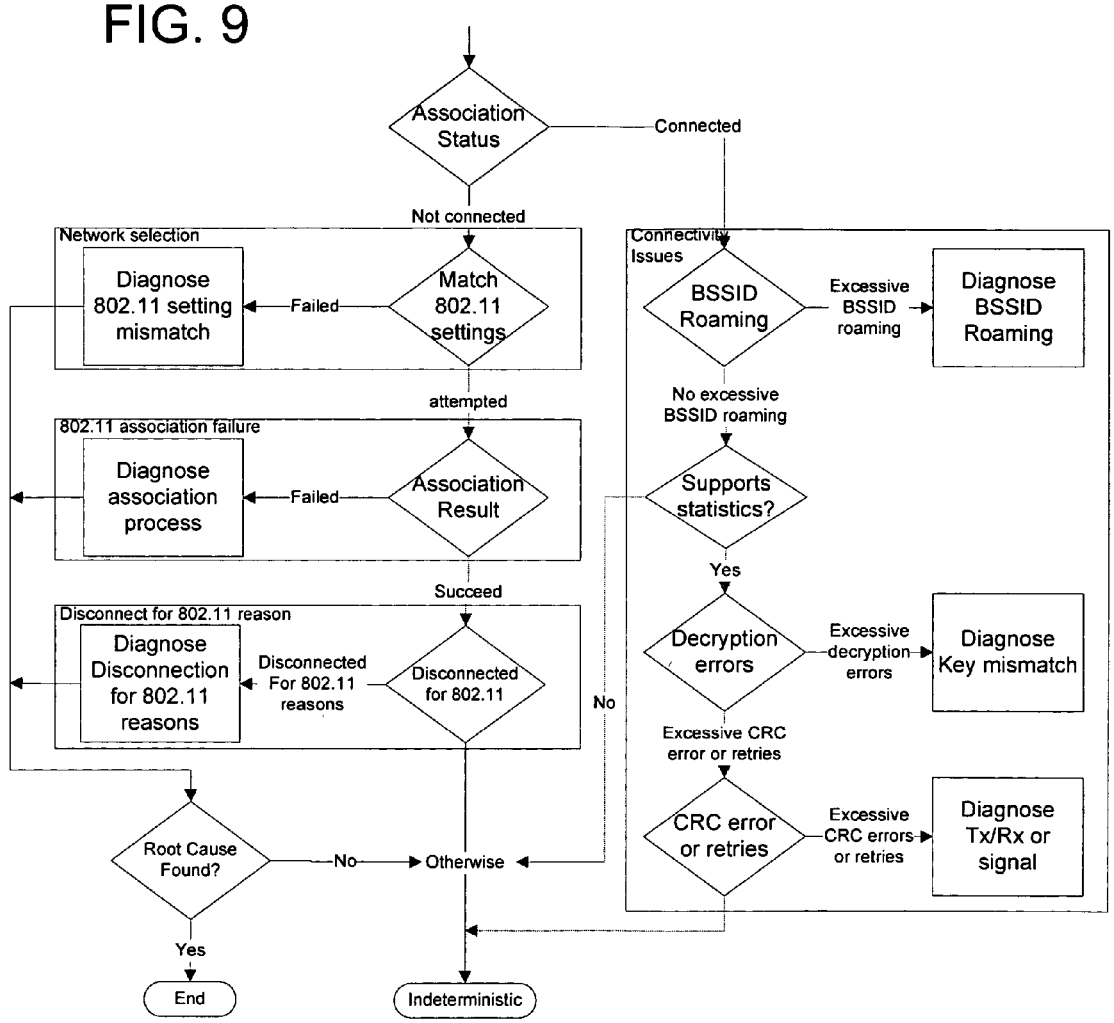
FIG. 9 illustrates a decision tree a helper class for a FAT media specific module takes to diagnose problems occurring within an 802.11 connection in accordance with the teachings of the present invention.

Turning now to FIG. 9, the FAT MSM helper class 410 diagnoses and repairs problems occurring within an 802.11 connection including profile management (802.11 portion); 802.11 association; roaming within an 802.11 network; and 802.11 network connectivity.

The FAT MSM helper class 410 is launched by the auto configuration helper class 416 via the NDF 420. It can not be invoked by external diagnostics initiator directly. In this case, the NDF 420 needs to pass the following key attributes to the helper class: Interface ID passed from the auto configuration helper class 416 and 802.11 network name. The Interface ID must be a value that uniquely identifies an 802.11 interface on the local machine. The 802.11 network name is passed from the auto configuration helper class 416. The 802.11 network name is a value that uniquely identifies an 802.11 network to which the interface wants to connect. If a value is present, the helper class will diagnose and repair connectivity under the context of the particular 802.11 network.

The FAT MSM helper class 410 determines the healthy status of the connection to a particular 802.11 network on an interface. If the conclusion is healthy, then it will return healthy to the NDF 420 and will not drill down the problem to any underlying helper classes or give out any hypothesis. The FAT MSM helper class 410 always opens a session handle to start a wireless diagnostics transaction. The diagnostics module 400 ensures there is only one session per interface at a time so that if the next helper class instance tries to open more handles on the same interface, the call will fail and helper class instance will defer the diagnostics request. The helper class 410 determines the healthy status based on the conditions listed below. If any condition is not met, the helper class bails out the procedure and returns unhealthy to NDF.

The first condition is that the interface exists and is associated with a desired 802.11 network. "Associate" means the interface successfully performed an 802.11 association with an AP in the wireless network. The connected network must be the same as the one given by the key attribute and the corresponding media connected and/or port up event is indicated.

The second condition is that the association maintains a good connectivity. This is only applicable if the fat network interface card (NIC) supports statistical information. A good connectivity occurs when packet transmission failed error rate and retry rate are within certain thresholds and packet reception decryption error rate is within a threshold.

The third condition is that the interface does not excessive roaming within the same 802.11 wireless network. Excessive roaming means that the interface makes a large number of roams between a limited number of APs (2 to 3) within a short amount of time. The threshold will be defined for a number of roams.

In the event that the fat NIC does not support certain capabilities such as providing statistical information, the FAT MSM helper class 410 may not be able to determine the healthy status. In such an event, the helper class 410 returns an undetermined status if all the other healthy conditions are met. If at least one healthy condition is not met, the helper class 410 returns unhealthy.

FIG. 9 illustrates a decision tree for diagnosing the above issues. Based on the nature of a problem, the decision tree either identifies the root causes, gives out hypothesis containing its dependencies, or returns undetermined if no root cause or hypothesis could be identified.

The Association Status checks whether the interface is experiencing an association issue. If the interface is associated with the specified network, then it might be a connectivity issue. Otherwise, it is some other issue. The helper class checks the current connection status by querying interface status and wireless network status.

The Match 802.11 settings checks whether there is a mismatch in MSM setting section among network profile, interface capabilities and visible wireless network to be connected. Group Policy settings might also be matched. The helper class checks cached network match result returned by wireless component.

The Diagnose 802.11 Setting Mismatch finds the root cause for 802.11 setting mismatch. This process finds out the first mismatch MSM settings and the root cause will contain the following information: components that are mismatched among profile settings, interface capability and network capabilities; and mismatched 802.11 MSM setting. Wireless components have defined a detailed set of reason codes for mismatched settings. Upon a mismatch during either network discovery or connection attempt, the wireless components will notify the diagnostics module 400 to mark this error in cached connection context information and logging information. In turn, the helper class 410*b* checks network match result from cached context information or logging information from the diagnostics module 400.

The Association Result checks whether the interface has passed association and indicated port up event. If there is a failure, the association process is diagnosed. The FAT MSM 404 does not have a way to retrieve the detailed information for association results other than a success (media connected event) or failure (media disconnected event). The helper class 410 retrieves the association result from the cached connection context information in the diagnostics module 400 or logging information. This check only needs to determine whether the association is successful.

The Diagnose Association Process diagnoses the root causes for 802.11 association failure due to various association failure reason codes returned by AP (codes are defined by IEEE specs) or signal quality. During association, the helper class tracks the events during association and result from the cached connection context information in the diagnostics module or logging information.

The Disconnected for 802.11 Reasons checks whether the interface has disconnected after passing association process and indicated port up event. If it is disconnected, then the root cause is diagnosed. The helper class retrieves the disassociation reason code from the cached connection context information in the core diagnostics module or logging information. This check only needs to determine whether there a disassociation happened.

The Diagnose Disconnection for 802.11 Reasons checks if the established connection was disconnected either because of request from local client or from AP due to 802.11 reasons. The helper class 410 retrieves the disassociation events and reason code from the cached connection context information in the diagnostics module or logging information. The diagnostics module 400 always marks the disassociation events in its cached context information and logging information when the disassociation event happens. If the disconnection is for an 802.11 reason, the root cause is diagnosed. The reason codes are defined by IEEE 802.11 specifications.

The BSSID Roaming checks if there is excessive roaming among BSSIDs within the same SSID. A threshold for roams per minute is defined for excessive BSSID roaming. The helper class 410 queries the statistical information for current connection about number of BSSID roaming and connection time from the cached connection context information in the diagnostics module 400.

The Diagnose BSSID Roaming diagnoses excessive BSSID roaming due to various reasons such as low signal quality. The diagnosis of a detailed root cause requires extra information such as roaming reasons. The diagnosis will be interested in reason for the last roam within the SSID. The helper class 410 queries the current connection statistical information about number of BSSID roams, connection time, and roaming reasons from the cached connection context information in the diagnostics module 400.

The Support Statistics checks if the fat adapter supports statistical counters and the corresponding query calls. If the statistics is supported, then the helper class 410 can continue diagnose connectivity issues, otherwise, the helper class 410 lacks information for further investigation and returns undetermined. The diagnostics module 400 should query the interface capability on statistical support and record it as part of the interface context. The helper class 410 queries this information the diagnostics module 400.

The Decryption Errors check if there are decryption errors for current connection. A threshold for decryption error rate is defined. The helper class 410 queries the statistical information for current connection about decryption error ratio from the cached connection context information in the core diagnostics module or query API.

The Diagnose Key Mismatch diagnoses decryption errors due to key mismatch or key missing. The helper class 410 queries the decryption error ratios for different traffic types in the current connection through either the cached connection context information in the diagnostics module 400 or query API.

The CRC Errors or Retries checks if there are high ratios for frame checksum (CRC) errors and packet retries. The diagnostics module 400 should retrieve the counters from the FAT MSM 404, calculate the delta values for the current connection, and save the data into the cache connection information context. The helper class 410 queries the statistical information for CRC errors and retries from the cached connection context information in the diagnostics module or query API.

The Diagnose Transmission/Reception Problems diagnose transmission/reception problems due to bad signal quality in interface or from AP, and environmental signal interference. The helper class 410 queries the statistical information for CRC errors and retries from the cached connection context information in the core diagnostics module or query API. It also retrieves other information such as signal quality.

The repair logic, validation logic, and cancel operation in the FAT MSM helper class 410 follows the same design and methods described above in the auto configuration helper class 416.

Figure 10:
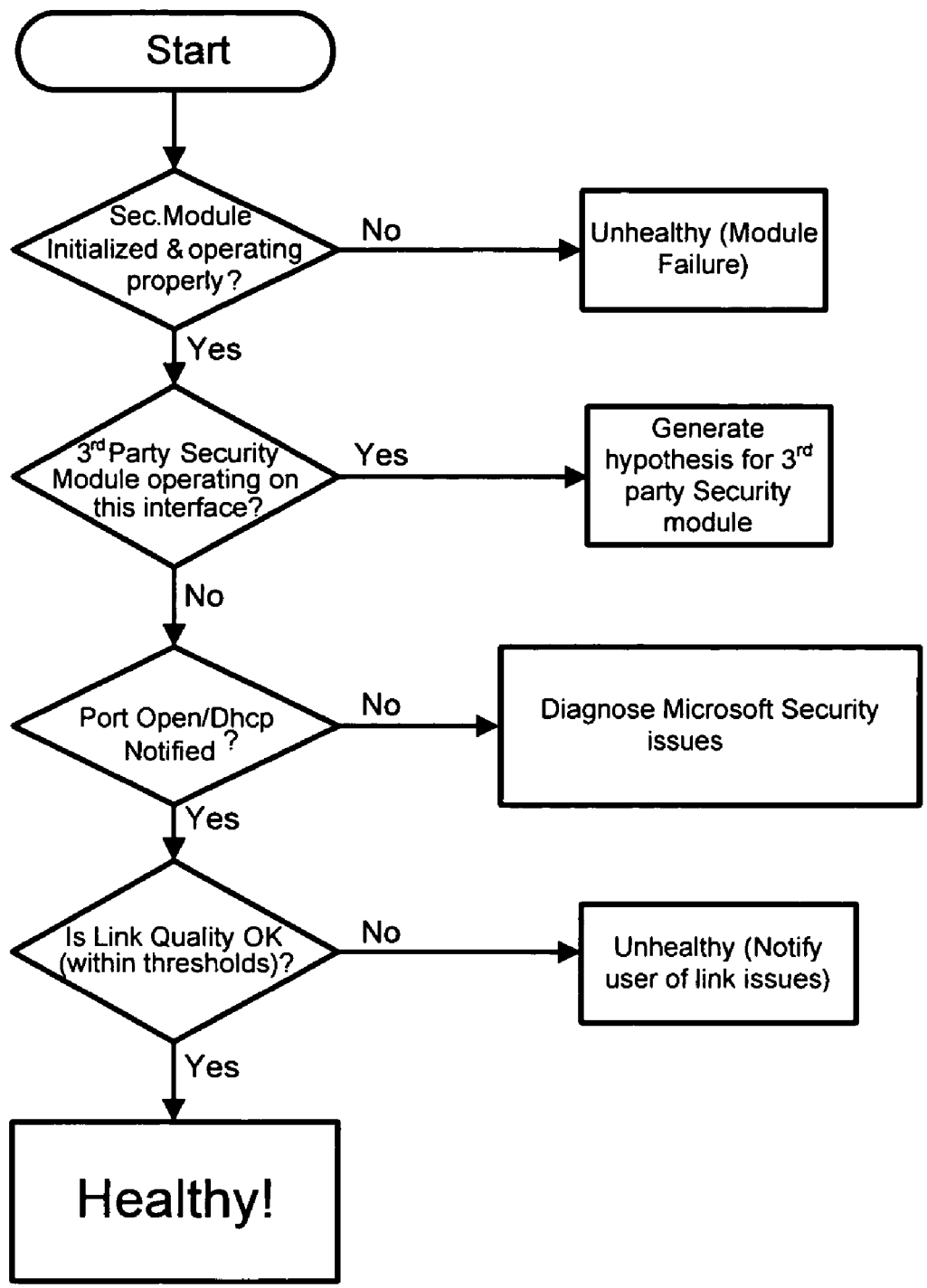
FIG. 10 illustrates a decision tree a helper class for a security layer module takes to diagnose problems occurring with pre-authentication security for a connection in accordance with the teachings of the present invention.

Turning now to FIG. 10, the security helper class 414 diagnoses and repairs issues related to security at the layer 2 level. Its activities occur in the following areas: security profile validation; pre-authentication security; 3rd party security module hypothesis generation; 1x authentication issues; user interaction; EAP interaction; key exchanges; set keys; and set final port status, or trigger next component.

The security helper class will be invoked by any of the MSM helper classes since all the layer 2 security operations are conducted within the framework of the MSMs 402, 404. The key parameters which need to be passed as attributes to the Layer 2 Security helper class are the interface ID, the target network name, and an optional specific network name. The interface ID is the GUID/LUID for that interface. The target network name is the SSID in most cases, but in the case of WISP (Wireless Internet Service Provider), is the WISP name. The optional specific network name is applicable only in the case of a WISP where the upper-level helper class will also include the SSID associated with the respective WISP on which the failure occurred. In addition, it is expected that NDF will either provide the user token, or impersonate the user when calling into the helper class methods.

When diagnosing security issues, the security helper class 414 will revert to the caller's original identity (LocalSystem) initially when opening the handle to the Core diagnostics modules, but thereafter it will make all subsequent calls in the user's context. This is done to ensure that only NDF or a caller with administrative privileges can initiate diagnosis.

The Security helper class determines the health status of an 802.11 connection based on the following criteria:
1. The Security Module was loaded and initialized successfully
2. The Security Profile is valid and matches the current network.
3. Pre-authentication succeeded
4. If 3rd Party security is active on this profile, generate hypothesis for 3rd party security.
5. Post-association authentication (802.1x) succeeded (if applicable).
6. Keys generated and plumbed successfully (if applicable)
7. Device manager is notified to update port status (RNWF), or Dhcp triggered (FAT).
8. Good signal strength (packet retry rates and data decryption errors within thresholds)

In the absence of an EAP or any other known security helper class, the Security Helper Class only has 3rd party security helper classes as possible dependencies. The Security helper class diagnoses root causes in the following categories: security module status; profile validation; capabilities validation (with respect to NIC and network capabilities); successful pre-authentication; no WISP-specific failures; EAP success (if applicable); user-interaction not pending (where applicable); user-responses applied (where applicable); 1x success (if applicable); key exchange success (if applicable); key set success (if applicable); device manager/Dhcp notification success; and Good Link quality.

To better understand the flow of the security helper class diagnostics logic, the diagnostics flow will be described in two sections: pre-authentication security and post-association security control flow.

FIG. 10 describes the extensible helper class control flow. The diagnostics control flow in this phase follows the following logic: verify security module health; verify $3^{rd}$ party module interaction; verify port opened or Dhcp notified; and check for link quality.

The verify security module health logic opens a handle to the core diagnostics module 400 and verifies the security module 406 has been loaded and is active on the interface. If the security is not loaded, or not functioning on that interface, then this would result in an unhealthy status.

The verify $3^{rd}$ party module interaction determines if the security on the interface is being managed by a $3^{rd}$ party component. If the security on this interface is being managed by a $3^{rd}$ party component, then the diagnosis is done and a hypothesis for the $3^{rd}$ party security component is generated.

The verify port opened or Dhcp notified is used to provide the successful result of the security module. In the case of RNWF, this means setting the port state to authorized (on success), and in the case of FAT, this would involve triggering the DHCP client to renew its address. If this port was not authorized to Open, then it means that the security failed for this network.

The check for link quality ensures that the link is functioning properly. If everything had succeeded, the security module will ensure that the link is functioning properly as the final check. While this would primarily be an MSM task, the Security module will not generate a hypothesis for the MSM since that could result in a cyclic loop—rather it will just call the appropriate library function directly to determine if there is a link quality issue.

The verify pre-auth status is needed to determine whether the failure was due to the pre-authentication settings, or post-association authentication. A pre-auth failure could be due the profile not matching certain invisible 802.11 settings of the network, such as Open vs Shared authentication mode, driver or AP association failures for security reasons, etc.

Figure 11:
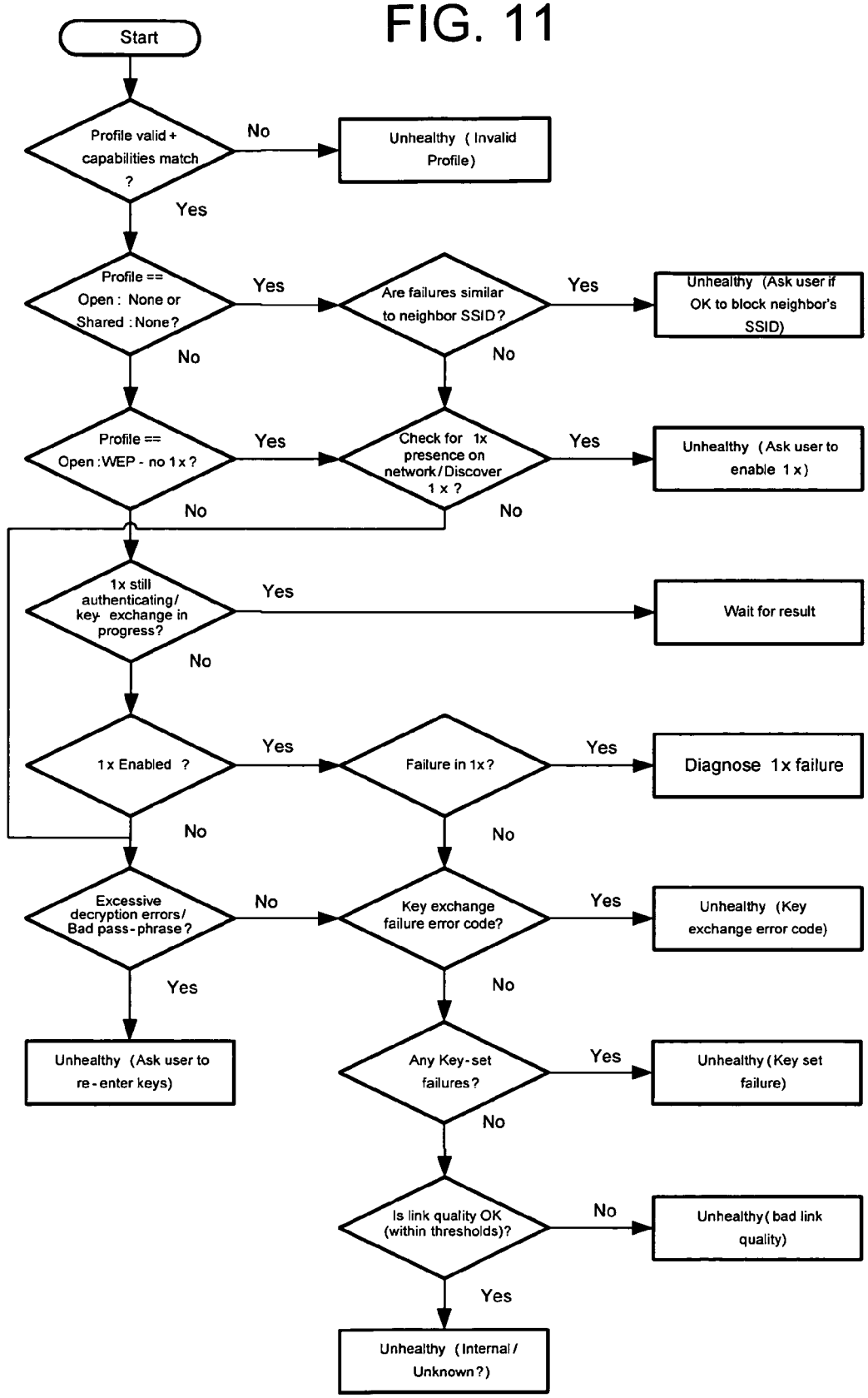
FIG. 11 illustrates a decision tree a helper class for a security layer module takes to diagnose problems occurring with post-association security control for a connection in accordance with the teachings of the present invention.

If the end of this diagnostic logic is reached without any failures encountered, then the next step is to diagnose the post-association security results. FIG. 11 describes the post-association control flow.

The diagnostics control flow in this phase follows the following logic: verify valid profile; check for neighbor SSID; check for WEP misconfiguration; check for 1x or key-exchange in progress; check for 1x failure; check for bad keys; check for key exchange/set failure; and check for link quality.

The verify valid profile ensures that the Security Module 406 thinks that the profile is valid for that interface and that the NIC's capabilities allow the profile to be set on that NIC. Also, is verifies that the profile is compatible with the (visible) configuration advertised by the network.

The insecure network—check for neighbor SSID is the case where the profile is set for an Open or Shared network with no keys, hence there is no security on this network. It is very difficult to diagnose any issues in this case. The invention tries to determine whether the network is being confused with a neighbor's network (same SSID) and if so inform the user.

The check for WEP misconfiguration is the case where the profile is set to do WEP without 1x enabled. An attempt to do 1x-discovery on this network is performed to ensure that the infrastructure is not expecting a 1x-enabled client.

The check for 1x or key-exchange in progress determines if 1x is still running or if the initial key exchange is not completing. If 1x is still running, or the initial key exchange is not completing, the helper class will wait for it to complete. The check for 1x failure diagnoses the 1x failure root-cause if 1x failed for any reason.

The check for bad keys determines if 1x is not enabled on this interface and no handshake is required. If 1x is not enabled on this interface and no handshake is required, then the security module interaction is also minimal. At this point, an attempt is made to verify whether the keys provided by the user are valid or not. If the user had entered incorrect keys, there would be an unusually high number of packet-retries, and also decryption failures. While diagnosing this problem, it is ensured that the AP we are trying to connect to is not a rogue AP either.

The check for key exchange/set failure determines if any failure occurred during the key exchanges, or while setting the keys in the NIC. This failure can also happen if the user provided a bad initial Master key/phrase for WPAPSK or WPA2PSK. The check for link quality verifies that the link quality is good.

Figure 12:
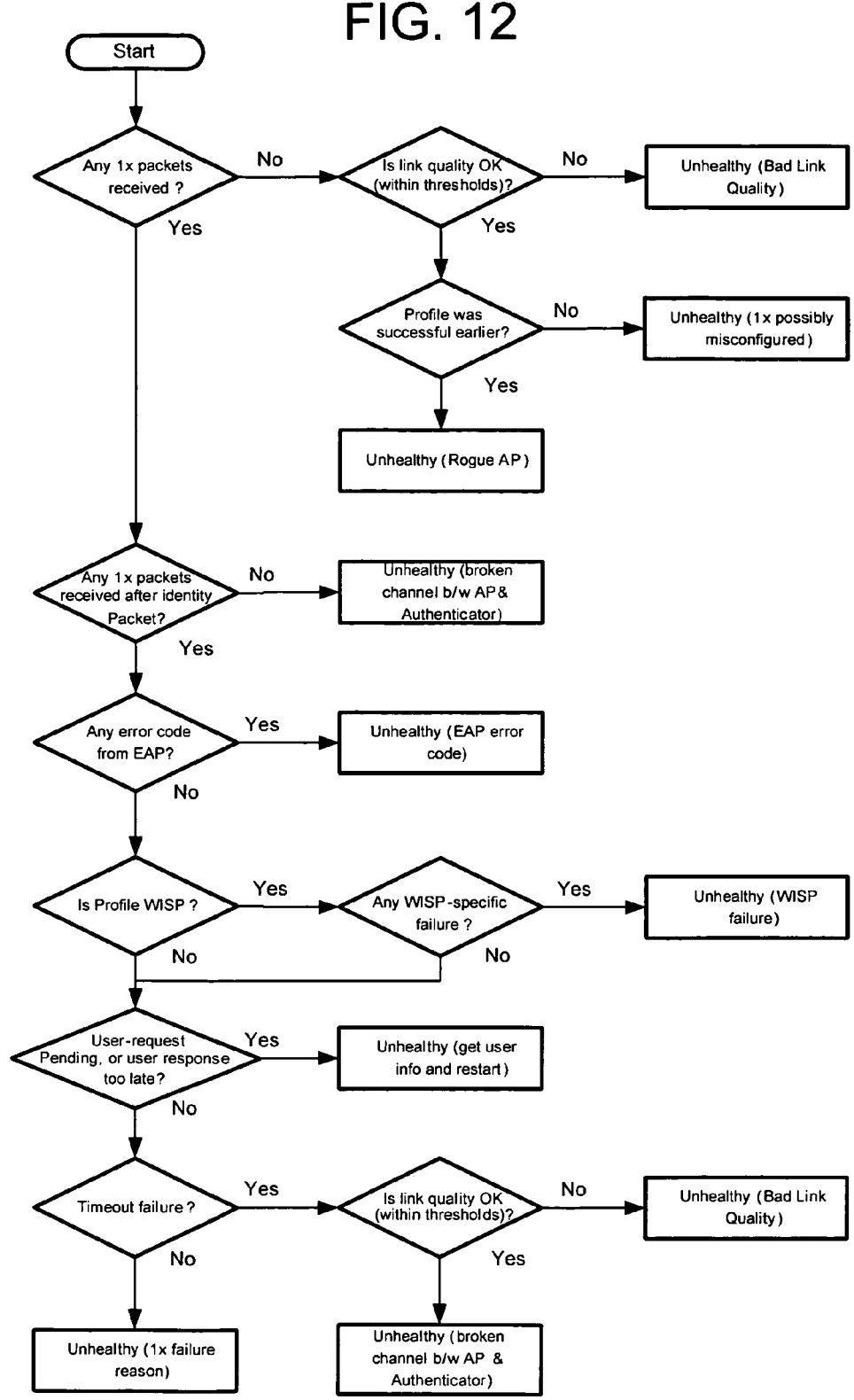
FIG. 12 illustrates a decision tree a helper class for a security layer module takes to diagnose problems occurring with 802.1x diagnosis control flow for a connection in accordance with the teachings of the present invention.

FIG. 12 describes the 802.1x diagnosis control flow. The diagnostics control flow in this phase follows the following logic: check for 1x misconfiguration; check for infrastructure issues; check for EAP failure; check for WISP-specific issue; check for user-interaction failure; and check for timeout failure.

The check for 1x misconfiguration checks if the user had accidentally configured the network to do 1x when it was never supported by the infrastructure. If the user had accidentally configured the network to do 1x when it was never supported by the infrastructure, this would result in the connection failing upon not receiving any responses to the 1x start messages. This would happen only in the case where the security had received absolutely no 1x packets ever on that network. If the network had succeeded with this profile sometime earlier, then either the network configuration was changed since then, or there is a rogue AP nearby (this would only be ascertained after verifying the link quality).

The check for infrastructure issues determines if no 1x packets are received after sending the identity response. If no 1x packets are received after sending the identity response, then this could be a case of the link between the AP and the Authenticator (Radius server) being temporarily down, or misconfigured.

The check for EAP failure determines if there is an EAP failure. The EAP channel can fail for a number of reasons. EAP will be required to provide the most precise error-code possible so that this failure can be conveyed to the user. In the absence of an EAP helper class, or some other security manager (e.g., certificates, etc), the most likely resolution will be a help link.

The check for WISP-specific issue is used for scenarios which are specific to WISP-based networks. These include TLV processing, ensuring user-interaction for password changes, account-related requests, etc. If such a failure occurred, the helper class will present the appropriate help-link to the user.

The check for user-interaction failure determines if there is an user-interaction failure. This scenario is encountered if the authentication failed to complete due to non-responsiveness of the user, or delayed response from the user. The security helper class will notify the user of the reason, and restart the authentication during the repair to give an opportunity to the user to provide the requested information.

The check for timeout failure determines if there is a timeout failure. This could happen if the link quality is not good. Otherwise, it could be an infrastructure issue.

The repair logic in the security helper class 414 follows the same design and algorithms as in auto configuration helper class 416. The repair options for the diagnosed problem will have already been determine at the time of diagnosis, and it will simply be a matter of providing the option to NDF when requested. The validation logic in the security helper class 414 follows the same design and algorithms as in auto configuration helper class 416. The cancel operation logic in the security helper class 414 follows the same design and algorithms as in auto configuration helper class 416.

Note that the auto configuration roaming logic management being off could be a healthy or an unhealthy state. The state can be healthy when the auto configuration roaming logic is disabled because a 3rd party utility is managing the roaming logic. This state is reported as 'indeterminate' by the auto configuration helper class 416 in order for the NDF 420 to ask for hypotheses in order for the dependency tree to be built correctly pointing to rest of the wireless modules involved in the communication session. The state can be an unhealthy state because the auto configuration service failed to start or initialize properly resulting in an error condition or bad state within the wireless service. The healthy state should be a known state as the auto configuration roaming logic can be disabled by third party applications using public APIs. The unhealthy state can be detected by wireless helper classes from the fact that the auto configuration service module (or any other wireless component) is not responding properly to API calls.

Note that in many cases, the root cause can be identified with 100% accuracy. However, there will be cases where a single root cause cannot be identified. Often, in these cases, wireless diagnostics may make informed 'guesses' of possible and most likely causes based on the symptoms and any logs available. In these cases, diagnostics cannot provide a single repair option. The diagnostics infrastructure presents a prioritized list of likely causes and related repair options in which the user can select. For example, having connection failure due to the radio being off or incorrect WEP key should be easily diagnosable with 100% accuracy. On the other hand, having intermittent connectivity problems or connection failure due to radio interference or noise, or being too far from AP is probably not diagnosable with 100% accuracy.

When a problem is not self-diagnosable or no solution is available, the operating system's diagnostics infrastructure provides the user a seamless integration into an assisted experience or to professional assistance with all the information needed to troubleshoot the problem readily available.

Now that the steps the helper classes take have been described, an example of the invention in operation follows. In this example, a mother is getting ready to pick up her children from school and wants to check out the traffic report on the Internet using her wireless laptop before she leaves. She opens the Internet Explorer and her connection attempt fails. The Internet Explorer consults the operating systems diagnostics infrastructure, which discovers there is a problem with network connectivity and further consults NDF 420. The NDF 420, in turn, asks different helper classes in the dependency tree for their component's health. The helper classes discover there is a problem with wireless connections and returns the cause and possible solution to the NDF 420 and the diagnostics infrastructure to be shown to the user. The mother is informed through the Internet Explorer user interface that she cannot connect because the radio on her WLAN card is off. She is provided a solution and an option to turn the radio on so she can connect and check the traffic report on the Internet. The table below identifies the possible root causes for the symptoms resulting from the connection failure.

Possible Configuration or Infrastructure Issues
Incorrect WEP key
802.1X enabled on client, not on AP
Radio off
Wrong Authentication Mode
(Open vs Shared)
3rd party client conflict/WZC not running With respect to the helper classes, the NDF 420 asks the helper class 416 for the auto configuration service module 408 for its health. The helper class 416 would return LowHealth status to the NDF 420. On further queries, the helper class 416 would return Lower Hypotheses and list the helper class 412 for 802.11 MSM as dependency (assuming only one 802.11 NIC is present and the driver is Native Wi-Fi miniport driver). The NDF 420 will then query the 802.11 MSM helper class 402 for its health in the same fashion. If the problem was with layer 2 authentication, the helper class 402 would return LowHealth and then Lower Hypotheses with L2 Security helper class 414 as its hypothesis. The NDF 420 would then continue the diagnosis by building the dependency until the last leaf or node is found.

However, in this case as the radio is off, the 802.11 MSM helper class 412 determines its component, the 802.11 MSM, is the source of the problem and identifies the root cause as radio being off. When asked its Lower or Downstream Hypotheses by NDF, the 802.11 MSM helper class 412 will return an empty list to the NDF 420 from which the NDF 420 will determine that the 802.11 MSM helper class 412 has the root cause. The NDF 420 will then ask the 802.11 MSM helper class 412 to provide repair options which can be action link or help link. The NDF 420 may ask resolution for both LowHealth and HighUtilization cases, even if the helper class 412 provided hypotheses pointing to other components. Resolution would typically include the following information: user friendly description of the resolution, Type (Action Link or Help Link) —e.g. link to setting to turn the radio on, the scope of resolution (user, process, machine), and privileges required to execute the resolution, cost, risk, etc.

The NDF 420 will then return the container for the diagnostics infrastructure to present the resolution to the user. If the user selects to execute the repair option offered, the NDF 420 will then ask the helper class 412 to execute and verify repair action. The helper class 412 is responsible for doing the repair and verifying the success of the operation and indicating it back to the NDF 420.

From the foregoing, it can be seen that wireless diagnostics that are non-intrusive and stay out of the way of a user has been described. In the case of a failure, the invention provides prescriptive guidance and/or possibly automatically fixes the problem without putting the user's computer or data at risk. When a problem is not self-diagnosable or no solution is available, the user is provided seamless integration into an assisted experience or to professional assistance with all the information needed to troubleshoot the problem readily available. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A wireless diagnostics module comprising:
    a distribution module adapted to converge and classify requests by at least one helper class;
    an application program interface in communication with the distribution module and the at least one helper class and adapted to retrieve diagnostics information and issue queries and active test requests;
    an event listener module in communication with the distribution module and adapted to provide an event tracing application program interface to in-process modules;
    an active diagnostics module in communication with the distribution module and adapted to issue active packet test requests to a media specific module; and
    a query module in communication with the distribution module and adapted to issue information query requests to the media specific module.

2. The wireless diagnostics module of claim 1 further comprising a storage module in communication with the distribution module.

3. The wireless diagnostics module of claim 2 wherein the storage module is in further communication with an operating system's diagnostics infrastructure.

4. The wireless diagnostics module of claim 1 wherein the distribution module is further adapted to distribute the requests to at least one of the event listener module, the active diagnostics module, and the query module.

5. The wireless diagnostics module of claim 1 further comprising a retry request module adapted to retry previous unsuccessful operations to reproduce at least one error.

6. The wireless diagnostics module of claim 1 wherein the wireless diagnostics module passively logs events when it is not actively diagnosing a problem.

7. The wireless diagnostics module of claim 6 wherein the wireless diagnostics module listens for events relating to the loading and unloading of modules by an auto configuration service.

8. The wireless diagnostics module of claim 1 wherein the wireless diagnostics module tracks each network connection attempt and keeps a cache of the results of recent connection attempts when it is not actively diagnosing a problem.

9. The wireless diagnostics module of claim 8 wherein information tracked for each network connection includes a reason for connecting, a reason for disconnecting, a frequency and number of media-events during this connection, and duration times for each activity during a connection.

10. A wireless diagnostics framework comprising:
a wireless diagnostics module having a distribution module adapted to converge and classify requests by at least one helper class, an application program interface in communication with the distribution module and the at least one helper class and adapted to retrieve diagnostics information and issue queries and active test requests, an event listener module in communication with the distribution module and adapted to provide an event tracing application program interface to in-process modules, an active diagnostics module in communication with the distribution module and adapted to issue active packet test requests to a media specific module, and a query module in communication with the distribution module and adapted to issue information query requests to the media specific module; and
wherein the at least one helper class indicates the health of its component in response to receiving a request for the component's health.

11. The wireless diagnostics framework of claim 10 wherein the at least one helper class indicates if its component has a healthy state or an unhealthy state.

12. The wireless diagnostics framework of claim 11 wherein the unhealthy state comprises one of a LowHealth state, a LowHealth Below state, a LowHealth Downstream state, a HighUtilization Above state, and a HighUtilization Upstream state.

13. The wireless diagnostics framework of claim 10 wherein the at least one helper class provides an indication of whether a resolution is available or is not available if its component is the root cause of a problem.

14. The wireless diagnostics framework of claim 10 wherein the at least one helper class provides an indication of whether a workaround is available or is not available for an identified dependency.

15. The wireless diagnostics framework of claim 10 wherein the at least one helper class runs one of a resolution and a workaround in response to receiving a command to execute the one of the resolution and the workaround.

16. The wireless diagnostics framework of claim 15 wherein the at least one helper class verifies if the one of the resolution and the workaround worked and provides an indication of the verification.

17. The wireless diagnostics framework of claim 10 wherein the at least one helper class provides hypotheses for components below and downstream of its component if its component is highly utilized.

18. The wireless diagnostics framework of claim 10 wherein the at least one helper class provides hypotheses for components above and upstream of its component if its component is highly utilized.

* * * * *